US012764519B2

(12) United States Patent
Kim

(10) Patent No.: US 12,764,519 B2
(45) Date of Patent: Oct. 13, 2026

(54) METHOD AND APPARATUS FOR TRANSMITTING SCHEDULING REQUEST FOR GAP ACTIVATION TRANSMISSION IN WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(73) Assignees: BLACKPIN INC., Seoul (KR); Soenghun Kim, Gyeonggi-do (KR)

( * ) Notice: Subject to any disclaimer, the term of this patent is extended or adjusted under 35 U.S.C. 154(b) by 297 days.

(21) Appl. No.: 18/197,742

(22) Filed: May 16, 2023

(65) Prior Publication Data

US 2023/0403550 A1 Dec. 14, 2023

(30) Foreign Application Priority Data

Jun. 9, 2022 (KR) ........................ 10-2022-0070092

(51) Int. Cl.
*H04W 72/00* (2023.01)
*H04W 8/22* (2009.01)
(Continued)

(52) U.S. Cl.
CPC ......... *H04W 8/22* (2013.01); *H04W 72/1263* (2013.01); *H04W 76/20* (2018.02); *H04W 80/02* (2013.01)

(58) Field of Classification Search
CPC ... H04W 8/22; H04W 72/1263; H04W 76/20; H04W 80/02; H04W 8/24; H04W 64/00;
(Continued)

(56) References Cited

U.S. PATENT DOCUMENTS 10,313,904 B2 6/2019 Moon et al.
12,375,571 B2 * 7/2025 Li .................... H04W 74/0833
(Continued)

FOREIGN PATENT DOCUMENTS

KR 10-2016-0125777 A 11/2016
KR 10-2020-0060501 A 5/2020

OTHER PUBLICATIONS

3GPP (3GPP TS 38.321 v17.0.0, NR; Medium Access Control (MAC)) protocol specification, Mar. 14, 2022).*
(Continued)

*Primary Examiner* — Lakeram Jangbahadur
(74) *Attorney, Agent, or Firm* — Nicholas Park

(57) ABSTRACT

The method includes transmitting, by the terminal to a base station, the UECapabilityInformation includes a first capability information related to positioning gap activation and a second capability information related to positioning gap activation, transmitting, by the terminal to a LMF, receiving, by the terminal from a base station, the RRCReconfiguration, triggering a Scheduling Request for a first MAC CE if the first MAC CE has been triggered and not cancelled and if uplink shared channel resources are not available for a new transmission, performing, by the terminal, Scheduling Request transmission based on a specific first configuration and a specific second configuration, transmitting, by the terminal to the base station to request activation of a first gap, the first MAC CE and receiving, by the terminal from the base station, a second MAC CE, the second MAC CE includes a fourth field and a fifth field.

6 Claims, 12 Drawing Sheets

(51) Int. Cl.
*H04W 72/1263* (2023.01)
*H04W 76/20* (2018.01)
*H04W 80/02* (2009.01)

(58) Field of Classification Search
CPC ............. H04W 24/08; H04W 72/0453; H04W 72/231; H04L 5/0098
See application file for complete search history.

(56) References Cited

U.S. PATENT DOCUMENTS

| | | | | |
|---|---|---|---|---|
| 2019/0182000 | A1 | 6/2019 | Futaki et al. | |
| 2022/0116903 | A1* | 4/2022 | Fakoorian | H04W 36/06 |
| 2023/0397184 | A1* | 12/2023 | Ren | H04L 5/005 |
| 2024/0007990 | A1* | 1/2024 | Guo | H04W 76/28 |

OTHER PUBLICATIONS

3rd Generation Partnership Project;Technical Specification Group Radio Access Network; NR; Radio Resource Control (RRC) protocol specification (Release 17), 3GPP TS 38.331 V17.0.0, Apr. 19, 2022.

3rd Generation Partnership Project; Technical Specification Group Radio Access Network; NR;Medium Access Control (MAC) protocol specification (Release 17), 3GPP TS 38.321 V17.0.0, Apr. 14, 2022.

MOIP, Decision to Grant a Patent issued for Korean Patent Application No. 10-2023-0097227, Feb. 23, 2026.

* cited by examiner

FIG. 1H

```
Musim-GapConfig ::=                 SEQUENCE {
    musim-GapConfigToRemoveList     Musim-GapConfigToRemoveList             OPTIONAL
    musim-GapConfigToAddModList     Musim-GapConfigToAddModList             OPTIONAL
}

Musim-GapConfigToRemoveList ::=         SEQUENCE (SIZE (1..maxNrofGapId)) OF Musim-GapId

Musim-GapConfigToAddModList ::=         SEQUENCE (SIZE (1..maxNrofDMGapId)) OF Musim-GapConfigToAddMo

Musim-GapConfigToAddMod ::=           SEQUENCE {
    musim-gapId                     GapId,
    musim-gaptype                   ENUMERATED {periodic, aperiodic },
    gapOffset                       INTEGER (0..159),       OPTIONAL
    mgl3                            ENUMERATED {ms1dot5, ms3, ms3dot5, ms4, ms5dot5, ms6, ms10, ms20},
OPTIONAL
    mgrp                            ENUMERATED {ms20, ms40, ms80, ms160},           OPTIONAL
    mgta                            ENUMERATED {ms0, ms0dot25, ms0dot5},            OPTIONAL
    gapOffset3                       INTEGER (160..10239),          OPTIONAL
    mgl4                            ENUMERATED {ms32, ms64, ms128, ms256},          OPTIONAL
    mgrp2                           ENUMERATED {sf64, sf128, sf256, sf512},         OPTIONAL
    mgn                             ENUMERATED {one, two, four, eight},             OPTIONAL
    ...,
}
```

1H-11

METHOD AND APPARATUS FOR TRANSMITTING SCHEDULING REQUEST FOR GAP ACTIVATION TRANSMISSION IN WIRELESS COMMUNICATION SYSTEM

CROSS-REFERENCE TO RELATED APPLICATION

This application claims priority to and the benefit of Korean Patent Application No. 10-2022-0070092, filed on Jun. 9, 2022, the disclosure of which is incorporated herein by reference in its entirety.

BACKGROUND

Technical Field

The present disclosure relates to transmitting scheduling request for gap activation transmission in wireless communication system.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

As the uses of terminals diversify, the need to control the operation of terminals by applying various gaps according to circumstances is emerging. For example, it is necessary to set a gap for measurement, a gap for MUSIM operation, or a gap for transmission power control so that the operation of the terminal can proceed efficiently.

SUMMARY

Aspects of the present disclosure are to address problem of activating gaps. The method includes transmitting to the base station via SRB1 a UECapabilityInformation, the UECapabilityInformation includes a Type7GapInfo2 indicating support of low latency measurement gap activation request and a Type7GapInfo1 indicating support of low latency measurement gap activation, transmitting to the LMF via SRB2 a ProvideCapabilities, the ProvideCapabilities includes a Type7GapInfo3 indicating support of low latency measurement gap activation, receiving from the base station a RRCReconfiguration, the RRCReconfiguration includes a MAC-CellGroupConfig IE and one or more PUCCH-Config IEs and a MeasGapConfig IE, setting up measurement gaps and activating some of them, performing Gap operation during the activated gaps, starting to perform location measurements toward NR, generating a MAC subPDU requesting activation of a measurement gap for positioning based on the result of logical channel prioritization, transmitting Type7Gap L2 request message or Type7Gap L3 request message, receiving a MAC PDU including a MAC subPDU at a first point of time, the MAC subPDU comprises a MAC subheader and a information resulting in measurement gap activation, activating measurement gaps in accordance with the received message and performing Gap operation.

BRIEF DESCRIPTION OF THE DRAWINGS

FIG. 1H is a diagram illustrating ASN.1 structure of IE configuring Type5Gap;

DETAILED DESCRIPTION

Figure 1A:
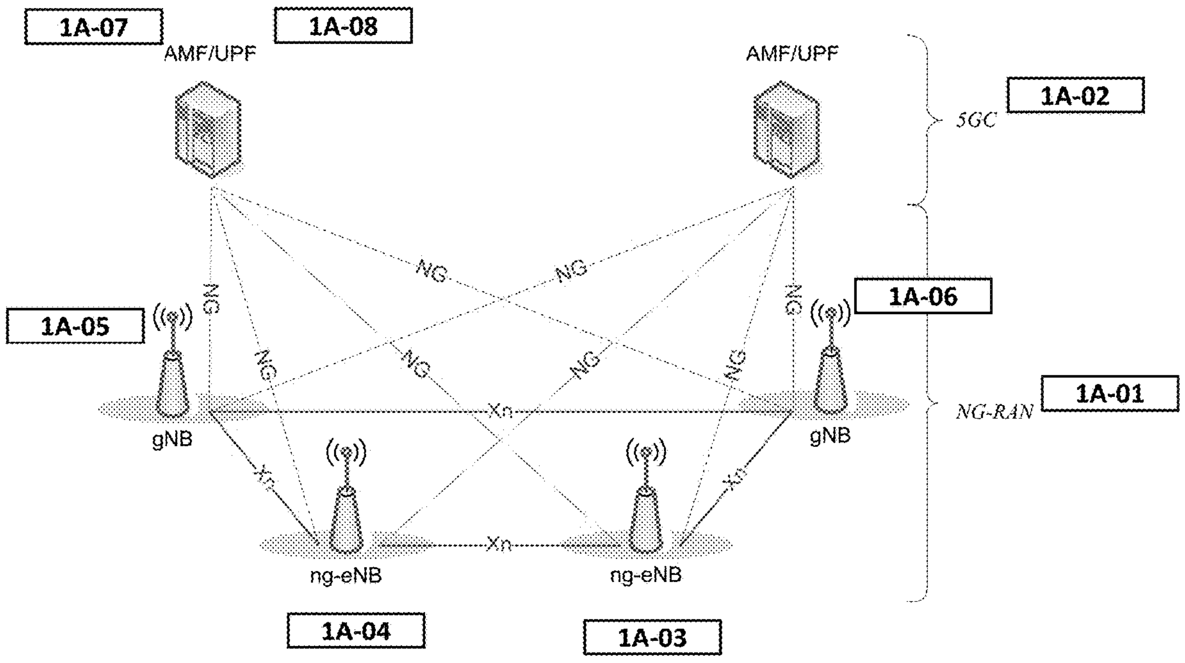
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RA-RNTI | Random Access RNTI |
| AMF | Access and Mobility Management Function | RAT | Radio Access Technology |
| ARQ | Automatic Repeat Request | RB | Radio Bearer |
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part | RNTI | Radio Network Temporary Identifier |
| CA | Carrier Aggregation | RRC | Radio Resource Control |
| CAG | Closed Access Group | RRM | Radio Resource Management |
| CG | Cell Group | RSRP | Reference Signal Received Power |
| C-RNTI | Cell RNTI | RSRQ | Reference Signal Received Quality |
| CSI | Channel State Information | RSSI | Received Signal Strength Indicator |
| DCI | Downlink Control Information | SCell | Secondary Cell |
| DRB | (user) Data Radio Bearer | SCS | Subcarrier Spacing |
| DRX | Discontinuous Reception | SDAP | Service Data Adaptation Protocol |
| HARQ | Hybrid Automatic Repeat Request | SDU | Service Data Unit |
| IE | Information element | SFN | System Frame Number |
| LCG | Logical Channel Group | S-GW | Serving Gateway |
| MAC | Medium Access Control | SI | System Information |
| MIB | Master Information Block | SIB | System Information Block |
| NAS | Non-Access Stratum | SpCell | Special Cell |
| NG-RAN | NG Radio Access Network | SRB | Signalling Radio Bearer |
| NR | NR Radio Access | SRS | Sounding Reference Signal |
| PBR | Prioritised Bit Rate | SSB | SS/PBCH block |
| PCell | Primary Cell | SSS | Secondary Synchronisation Signal |
| PCI | Physical Cell Identifier | SUL | Supplementary Uplink |
| PDCCH | Physical Downlink Control Channel | TM | Transparent Mode |
| PDCP | Packet Data Convergence Protocol | UCI | Uplink Control Information |
| PDSCH | Physical Downlink Shared Channel | UE | User Equipment |
| PDU | Protocol Data Unit | UM | Unacknowledged Mode |
| PHR | Power Headroom Report | CRP | Cell Reselection Priority |
| PLMN | Public Land Mobile Network | | |
| PRACH | Physical Random Access Channel | | |
| PRB | Physical Resource Block | | |
| PSS | Primary Synchronisation Signal | | |
| PUCCH | Physical Uplink Control Channel | | |
| PUSCH | Physical Uplink Shared Channel | | |

Table 2 lists the terminologies and their definition used throughout the present disclosure.

TABLE 2

| Terminology | Definition |
|---|---|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |

TABLE 2-continued

| Terminology | Definition |
|---|---|
| discardTimer | Timer to control the discard of a PDCP SDU. Starting when the SDUa rrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code-Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUS from this logical channel can be transmitted using an uplink grant resulting in any PUSCH duration. |
| NR | NR radio access |
| P Cell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |

TABLE 2-continued

| Terminology | Definition |
|---|---|
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within Reconfiguration WithSync of the NR PSCell (if configured) and all other parameters configured except for:<br>parameters within ReconfigurationWithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and

- IP and Ethernet header compression, uplink data decompression and encryption of user data stream; and
- Selection of an AMF at UE attachment when no routing to an MME can be determined from the information provided by the UE; and
- Routing of User Plane data towards UPF; and
- Scheduling and transmission of paging messages; and
- Scheduling and transmission of broadcast information (originated from the AMF or O&M); and
- Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
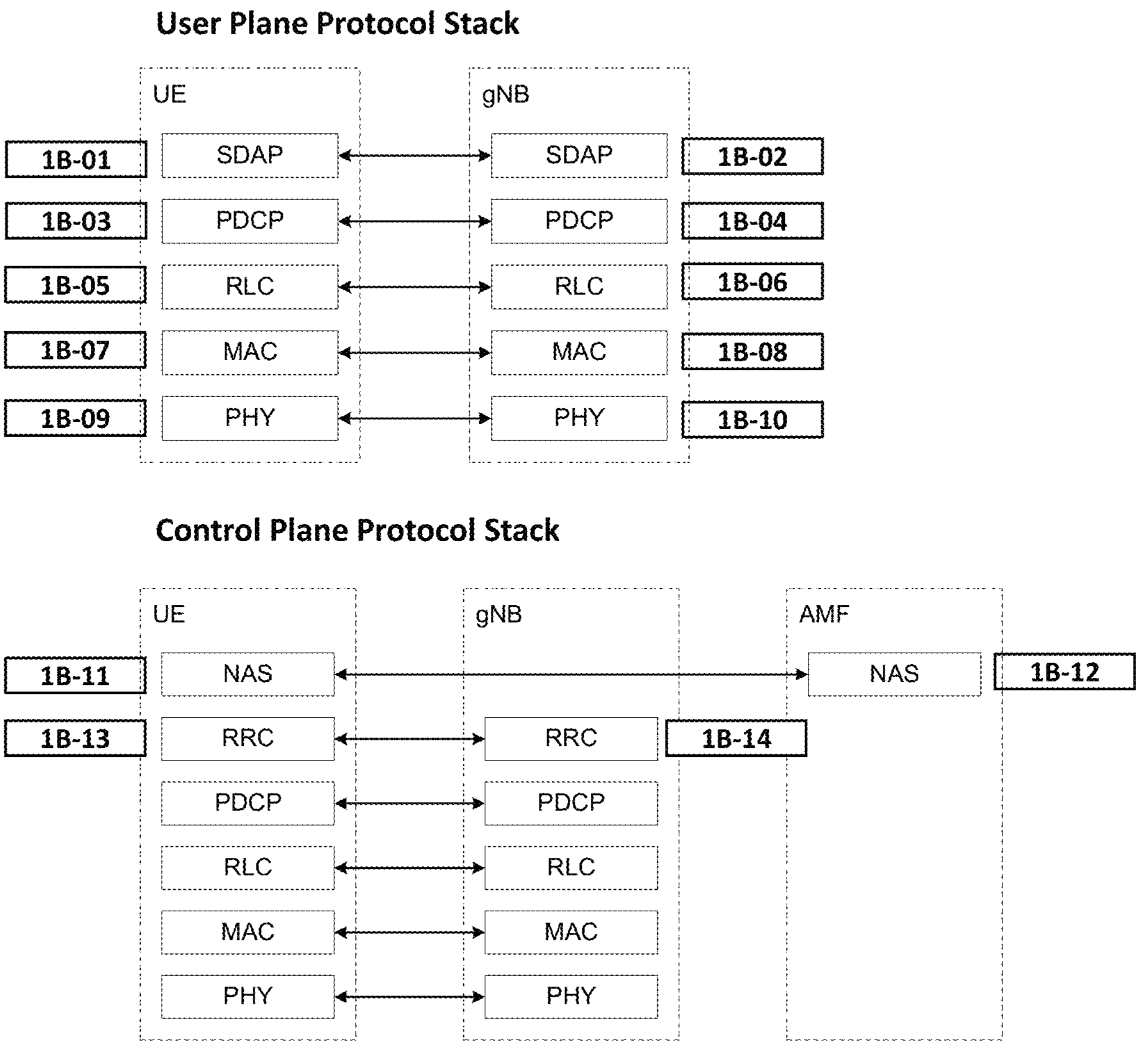
FIG. 1B is a diagram illustrating a wireless protocol architecture in an 5G system to which the disclosure may be applied.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

A reduced capability UE or RedCap UE has lower performance than a general UE and is used in limited scenarios such as IOT. Compared to a typical terminal having a bandwidth of 100 MHz, a transmission/reception speed of several Gbps, and four or more Rx processing units (Rx branches), RedCap terminals have a bandwidth of 20 MHz, a transmission/reception speed of several tens of Mbps, and two or less Rx processing units.

The present invention provides a method and apparatus for a RedCap UE to access a cell supporting RedCap, receive system information, and perform necessary operations. In particular, the terminal applies search space 0 (Search Space 0, hereinafter SS #0) and control resource set 0 (Control Resource Set 0, hereinafter CORESET #0) in the initial bandwidth part (IBWP) to obtain system information.

Figure 1C:
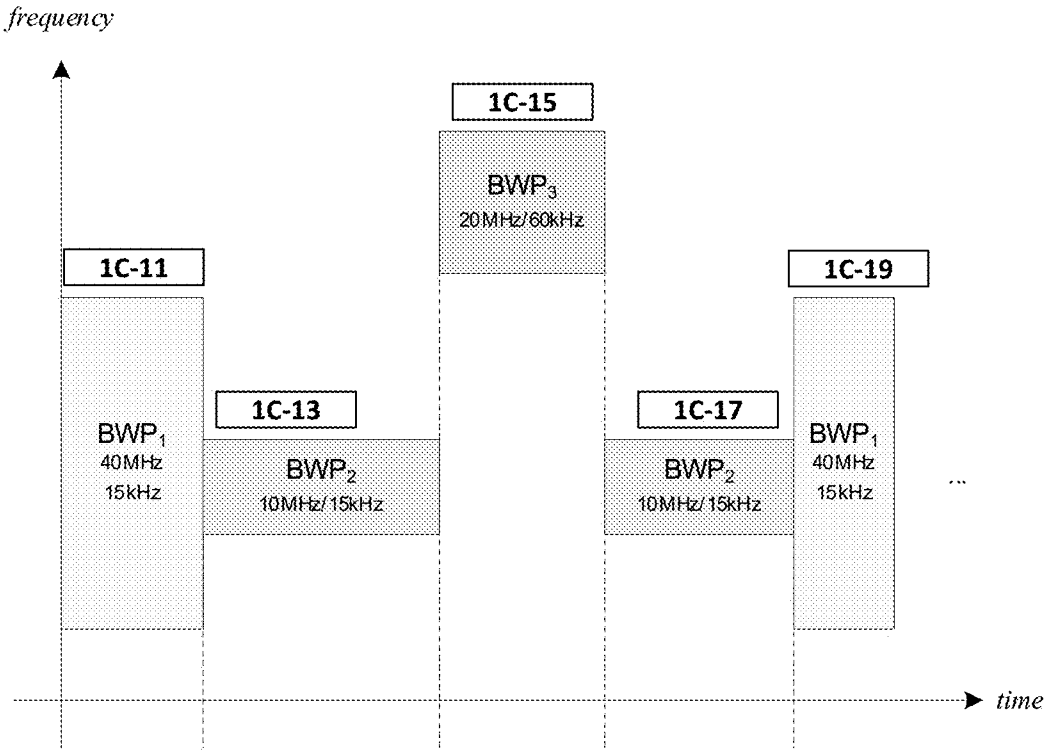
FIG. 1C is a diagram illustrating an example of a bandwidth part.

FIG. 1C is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1C describes a scenario where 3 different BWPs are configured:

BWP1 with a width of 40 MHz and subcarrier spacing of 15 kHz; 1C-11 or 1C-19

BWP2 with a width of 10 MHz and subcarrier spacing of 15 kHz; 1C-13 or 1C-17

BWP3 with a width of 20 MHz and subcarrier spacing of 60 kHz. 1C-15

Figure 1D:
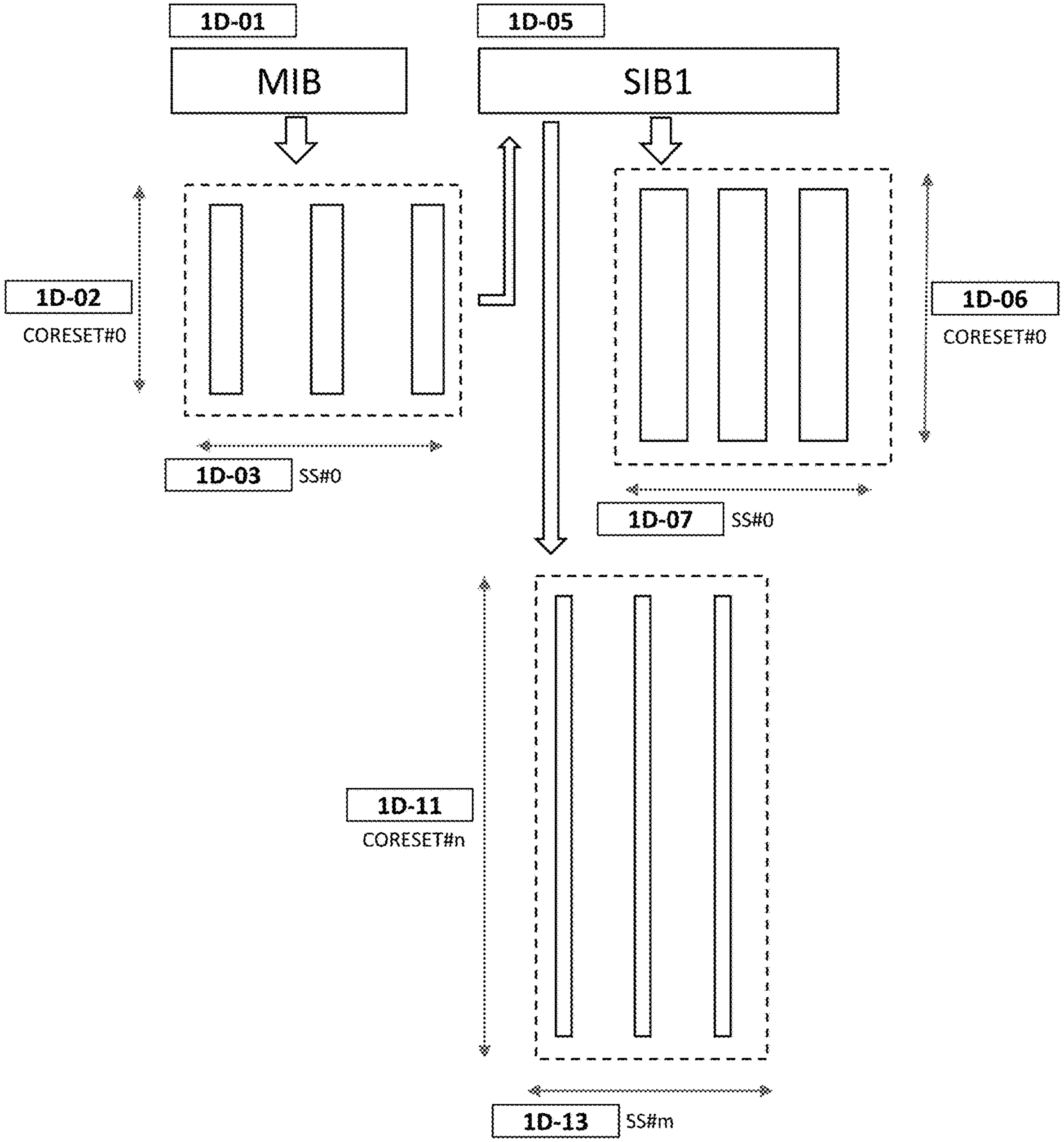
FIG. 1D is a diagram illustrating an example of a search space and a control resource set.

FIG. 1D is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1D-01, the UE recognizes CORESET #0 1D-02 and SS #0 1D-03 for receiving SIB1 using predetermined information included in the MIB. The UE receives SIB1 1D-05 through CORESET #0 1D-02 and SS #0 1D-03. In SIB1, information constituting CORESET #0 1D-06 and SS #0 1D-07 and information constituting another CORESET, for example, CORESET #n 1D-11 and SS #m 1D-13 may be included.

The terminal receives necessary information from the base station before the terminal enters the RRC_CONNECTED state, such as SIB2 reception, paging reception, and random access response message reception by using the CORESETs and SS s configured in SIB 1. CORESET #0 1D-02 configured in MIB and CORESET #0 1D-06 configured in SIB1 may be different from each other, and the former is called a first CORESET #0 and the latter is called a second CORESET #0. SS #0 1D-03 configured in MIB and SS #0 1D-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

A Serving Cell may be configured with one or multiple BWPs.

UE can be configured with one or more DL BWPs and one or more UL BWPs in a serving cell. If the serving cell operates in paired spectrum (i.e., FDD band), the number of DL BWPs and the number of UL BWPs can be different. If the serving cell operates in unpaired spectrum (i.e., TDD band), the number of DL BWPs and the number of UL BWPs is same.

SIB1 includes a DownlinkConfigCommonSIB and a UplinkConfigCommonSIB and a tdd-UL-DL-ConfigurationCommon.

TDD-UL-DL-ConfigurationCommon is cell specific TDD UL/DL configuration. It consists of subfields such as referenceSubcarrierSpacing, pattern1, and pattern2.

ReferenceSubcarrierSpacing is the reference SCS used to determine the time domain boundary in the UL-DL pattern.

Pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

DL-UL-TransmissionPeriodicity indicates the period of the DL-UL pattern.

NRofDownlinkSlots indicates the number of consecutive full DL slots in each DL-UL pattern.

NRofDownlinkSymbols indicates the number of consecutive DL symbols from the beginning of the slot following the last full DL slot.

NRofUplinkSlots indicates the number of consecutive full UL slots in each DL-UL pattern.

NRofUplinkSymbols indicates the number of consecutive UL symbols at the last time point of a slot preceding the first full UL slot.

Slots between the last full DL slot and the first full UL slot are flexible slots. full UL slot is also called static UL slot. UL slot in this disclosure is static UL slot.

DownlinkConfigCommonSIB includes BWP-DownlinkCommon IE for initial DL BWP. UplinkConfigCommonSIB includes BWP-UplinkCommon IE for initial UL BWP. BWP-id of initialDownlinkBWP is 0.

A RRCReconfiguration message includes one or more BWP-Downlink and one or more BWP-Uplink and a firstActiveDownlinkBWP-Id and a bwp-InactivityTimer and a defaultDownlinkBWP-Id and a BWP-DownlinkDedicated for the initial DL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP.

The BWP-UplinkDedicated is used to configure the dedicated (UE specific) parameters of an uplink BWP.

FirstActiveDownlinkBWP-Id contains the ID of the DL BWP to be activated upon performing the RRC (re-)configuration.

DefaultDownlinkBWP-Id is the ID of the downlink bandwidth part to be used upon expiry of the BWP inactivity timer.

BWP-InactivityTimer is the duration in ms after which the UE falls back to the default Bandwidth Part RRCReconfiguration message includes one or more SCellConfig IEs. A SCellConfig IE is used to configure a secondary cell. A SCellConfig IE can includes a serving cell index and a serving cell configuration and a sCellDeactivationTimer.

Figure 1E:
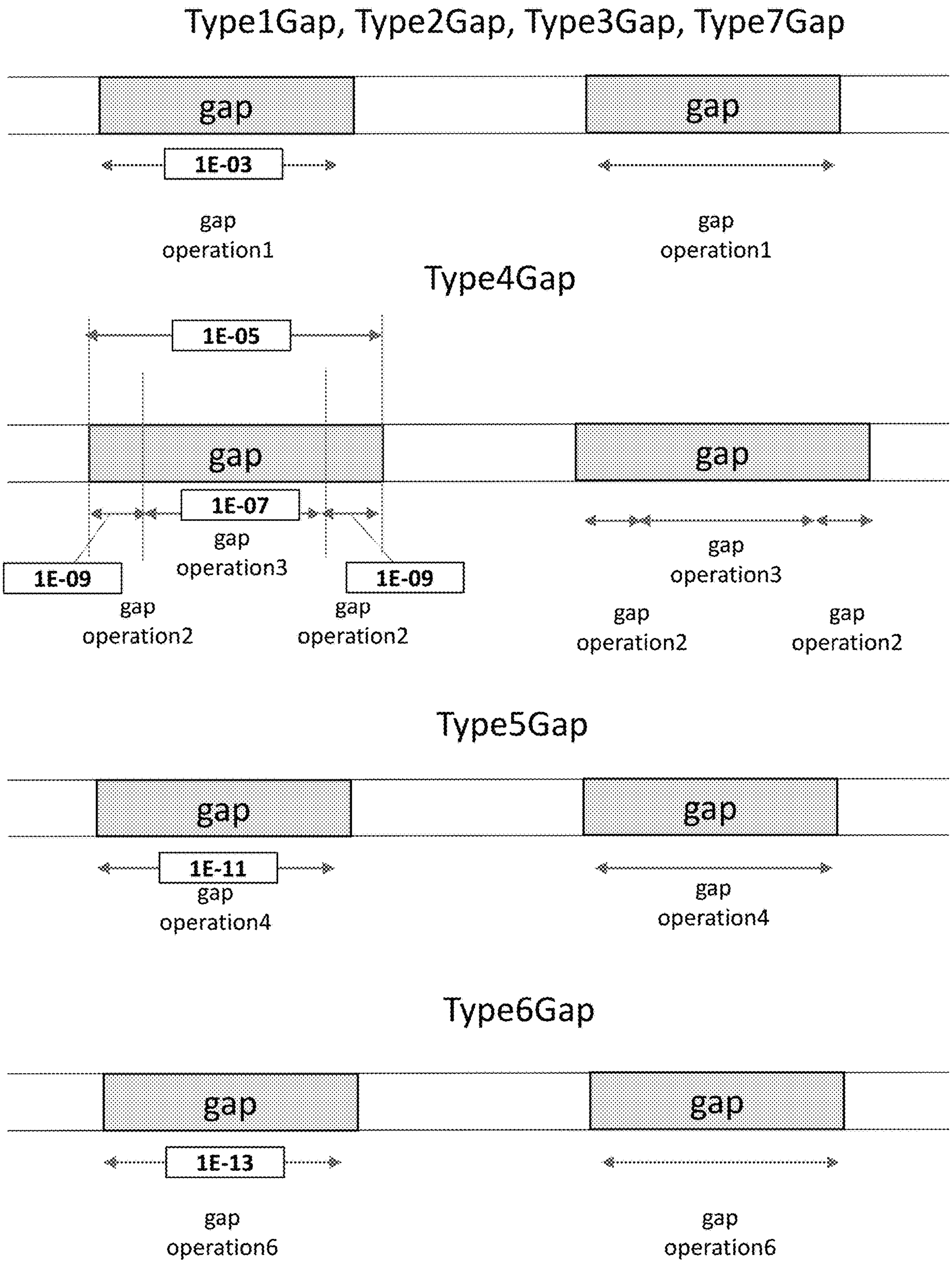
FIG. 1E is a diagram illustrating various gaps.

FIG. 1E is a diagram illustrating various gaps.

In this disclosure six gaps are defined: Type1Gap, Type2Gap, Type3Gap, Type4Gap, Type5Gap and Type6Gap and Type7Gap.

Type1Gap is used for RRM measurement on all FR1 frequencies or on all FR2 frequencies or on all frequencies. Type1Gap is always activated once it is configured. During a Type1Gap 1E-03, UE performs gap operation1.

Type2Gap is used for RRM measurement on all frequencies. Type2Gap is activated only when an associated BWP is activated (or deactivated). During a Type2Gap 1E-03, UE performs gap operation1-1. A Type2Gap can be called preconfigured gap.

Type3Gap is used for RRM measurement on specific frequency (or frequencies). Type3Gap is always activated once it is configured. During a Type3Gap 1E-03, UE performs gap operation1-1. A Type3Gap can be called concurrent gap. A type3Gap is associated with a frequency if the ID of the type3Gap is indicated in the measurement object of the frequency.

One or more type3Gaps can be associated with a measurement object (i.e. a configuration information for a measurement object can includes a plurality of measGapId(s)). In this case, the plurality of type3Gaps are used simultaneously for measurement on the frequency associated with the measurement object. It is useful in circumstances where adjacent neighboring cells are not synchronized with each other.

Type4Gap is used for RRM measurement on all FR1 frequencies or on all FR2 frequencies or on all frequencies. UE performs data activity like DL-SCH reception during Type4Gap. A Type4Gap 1E-05 consists of two interruption periods 1E-09 and one measurement period 1E-07. During the interruption periods, UE performs gap operation 2. During the measurement period 1E-07, UE performs gap operation 3. A Type4Gap can be called NCSG (Network Controlled Small Gap).

Type5Gap is used for activity in the other USIM. During a Type5Gap 1E-11, UE performs gap operation4. A Type5Gap can be called MUSIM Gap.

Type6Gap is used for power management. During a Type6Gap 1E-13, UE performs gap operation6. Type6Gap starts with an UL slot. UE determines the UL slot based on the tdd-UL-DL-ConfigurationCommon.

Figure 1F:
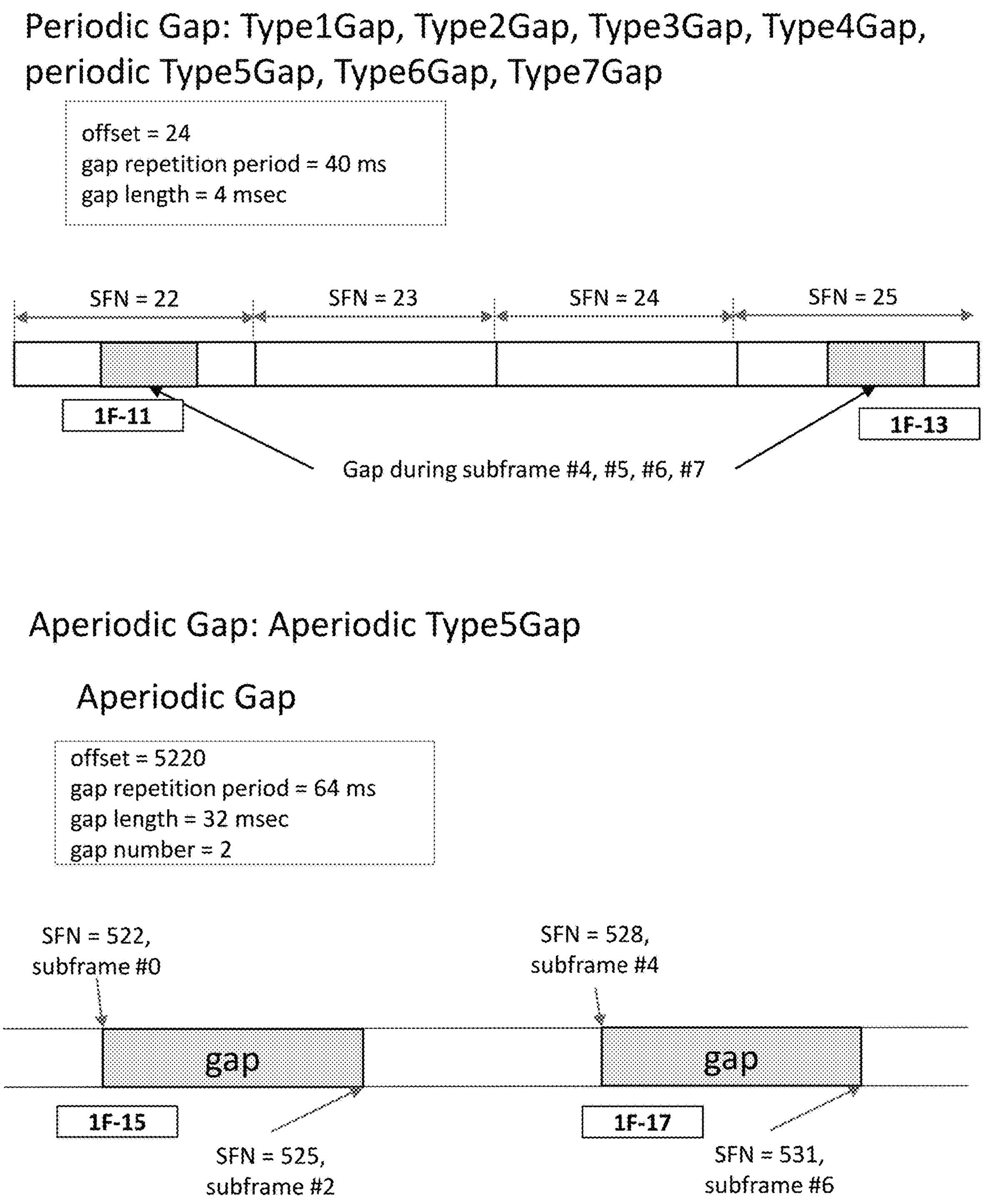
FIG. 1F is a diagram illustrating gap patterns of various gaps.
Figure 1G:
FIG. 1G is a diagram illustrating ASN.1 structure of IE configuring various gaps.

Type7Gaps are associated with the measurement of PRS for RSTD, UE-RxTx Time Difference, PRS-RSRP and PRS-RSRPP. Type7Gaps are deactivated initially when configured. Type7Gaps are activated by the base station based on the request from the UE. Type7Gap is a preconfigured MG for PRS measurements FIG. 1F is a diagram illustrating gap patterns of various gaps.

Type1Gap and Type3Gap and Type4Gap and Type6Gap are periodically occurring once they are configured. Type2Gap and Type7Gap are periodically occurring once configured and activated. Type5Gap is either periodically occurring or aperiodically occurring once configured.

The pattern of periodic gaps is controlled by an offset parameter and a gap repetition period parameter and a gap length parameter. For example, when offset is 24 and gap repetition period is 40 ms and gap length is 4 ms, the first gap(1F-11) occurs at subframe #4 of SFN 22 and continues 4 msec. The second gap(1F-13) occurs at subframe #4 of SFN 25 and continues 4 msec and so on.

The pattern of aperiodic gaps is controlled by offset parameter and gap repetition period parameter and gap length parameter and gap number parameter. For example, when offset is 5220 and gap repetition period is 64 ms and gap length is 32 ms, the first gap 1F-occurs at subframe #0 of SFN 522 and continues 32 msec. The second gap 1F-17 occurs at subframe #4 of SFN 528 and continues 32 msec. Since gap number is 2, only two gaps occur.

To configure Type1Gap or Type2Gap or Type3Gap or Type4Gap or Type7Gap, MeasGapConfig IE is used. MeasGapConfig IE is included in MeasConfig IE. MeasConfig 1E is included in RRCReconfiguration message.

MeasGapConfig IE may include a gapFR2 field and a gapFR1 field and a gapUE field and a PosMeasGapPreConfigToAddModList field and a PosMeasGapPreConfigToReleaseList field and a gapToAddModList field and a gapToReleaseList field.

To configure Type5Gap, Musim-GapConfig IE is used. Musim-GapConfig IE is included in RRCReconfiguration message.

Musim-GapConfig IE can includes musim-GapConfigToRemoveList and musim-GapConfigToAddModList. musim-GapConfigToAddModList consist of plurality of musim-GapConfigToAddMod.

To configure Type6Gap, Type6GapConfig IE is used. Type6GapConfig IE is included in RRCReconfiguration message.

Figure 2:
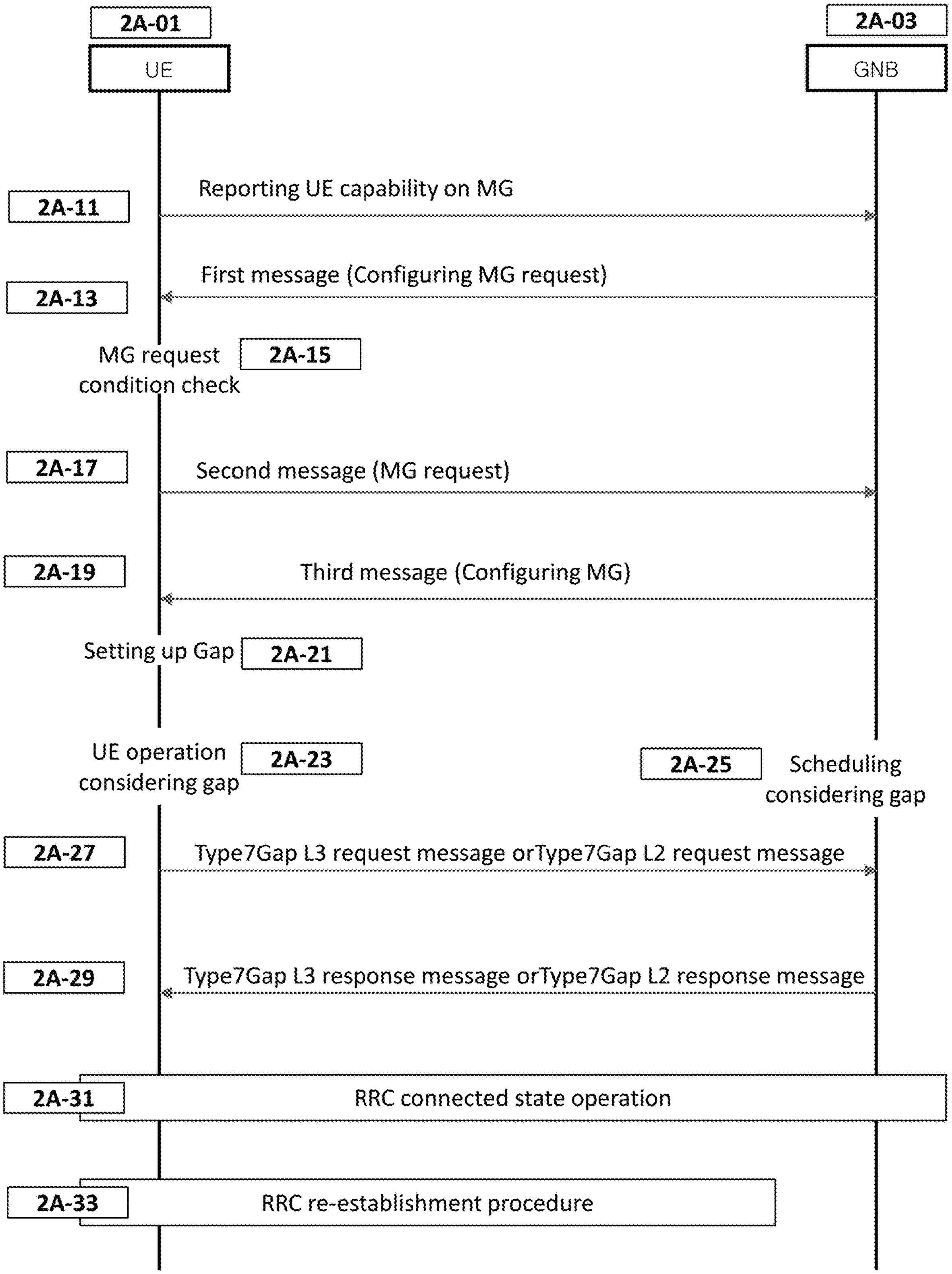
FIG. 2 is a diagram illustrating operations of a terminal and a base station according to an embodiment of the present invention.

FIG. 2 is a diagram illustrating the operations for gap configuration.

In 2A-11, UE transmits GNB UECapabilityInformation message. UECapabilityInformation message includes following gap related capability information: gap-request-capability-information, gap-configuration-capability-information.

gap-request-capability-information includes following information: NeedForGap-Reporting, musim-NeedForGap-Reporting UE can request Type1Gap and Type2Gap and Type3Gap and Type4Gap by transmitting either RRCReconfigurationComplete message or RRCResumeComplete message or LocationMeasurementInfo.

UE can request Type5Gap by transmitting UEAssistanceInformation.

For UE to request gap by transmitting RRCReconfigurationComplete or RRCResumeComplete or UEAssistanceInformation, GNB needs to configure UE to request gap. GNB determines it based on reported capability. UE can request gap by LocationMeasurementInfo without any prior configuration.

NeedForGap-Reporting indicates whether the UE supports reporting the measurement gap requirement information for NR target in the UE response to a network configuration RRC message. It is enumerated with a single value of "support". It is per UE capability. A single IE can be present in UECapability for NR. Absence of the IE indicates the feature is not supported by the UE. Presence of the IE indicates the feature is supported by the UE in FR1 and in FR2 and in FDD and in TDD.

MUSIM-NeedForGap-Reporting indicates whether the UE supports reporting the gap requirement information for MUSIM. It is enumerated with a single value of "support". It is per UE capability. A single IE can be present in UECapability for NR. Absence of the IE indicates the feature is not supported by the UE. Presence of the IE indicates the feature is supported by the UE in FR1 and in FR2 and in FDD and in TDD.

NeedForGap-Reporting indicates the capability related to type1Gap and type2Gap and type3Gap and type4Gap. If NeedForGap-Reporting and supportType2Gap are reported, UE supports reporting the measurement gap requirement information for Type2Gap. If NeedForGap-Reporting and supportType4Gap are reported, UE supports reporting the measurement gap requirement information for Type4Gap. If NeedForGap-Reporting is reported, UE supports reporting the measurement gap requirements for Type1Gap and Type3Gap.

UE does not report capability on whether the UE support reporting the measurement gap requirement information in the UE initiated RRC message (i.e., LocationMeasurementInfo).

GAP-configuration-capability-information includes following information: supportedGapPattern, supportType2Gap, supportType4Gap, supportType5Gap, supportType6Gap and supportedGapCombination and Type7GapInfo1 and Type7GapInfo2.

SupportedGapPattern indicates measurement gap pattern(s) optionally supported by the UE. It is a bit string with 22 bits. The leading/leftmost bit (bit 0) corresponds to the gap pattern 2, the next bit corresponds to the gap pattern 3 and so on. A gap pattern is defined by a Gap Length and a Repetition Period. It is per UE capability. The supported gap patterns are supported by the UE in FR1 and in FR2 and in FDD and in TDD.

SupportType2Gap indicates whether the UE supports Type2Gap (i.e., gap activated and deactivated depending on which BWP is activated; DL BWP dependent gap). It is per band capability. One or more IEs can be present in UECapability for NR. Absence of the IE in a band information indicates the feature is not supported by the UE in the corresponding band. Presence of the IE indicates the feature is supported by the UE in the corresponding band.

Alternatively, it can be per UE capability. In this case, a single IE can be present in UECapability for NR. Absence of the IE indicates the feature is not supported by the UE. Presence of the IE indicates the feature is supported by the UE in FR1 and in FDD and in TDD. To indicate whether UE support Type2Gap in FR2, additional capability information is used.

SupportType4Gap indicates whether the UE supports Type4Gap (i.e., gap consists of interruption period and measurement period; gap where interruption on data activity occurs in the beginning of a gap and in the end of a gap; gap where measurement is performed without interruption on data activity in the middle of the gap). It is per band capability. One or more IEs can be present in UECapability for NR. Absence of the IE in a band information indicates the feature is not supported by the UE in the corresponding band. Presence of the IE indicates the feature is supported by the UE in the corresponding band.

Alternatively, it can be per UE capability. In this case, a single IE can be present in UECapability for NR. Absence of the IE indicates the feature is not supported by the UE. Presence of the IE indicates the feature is supported by the UE in FR1 and in FR2 and in FDD and in TDD.

SupportType5Gap indicates whether the UE supports Type5Gap. Alternatively, it indicates whether UE supports MUSIM assistance information reporting. It is per UE capability. A single IE can be present in UECapability for NR. Absence of the IE indicates the feature is not supported by the UE. Presence of the IE indicates the feature is supported by the UE in FR1 and in FR2 and in FDD and in TDD.

SupportType6Gap indicates whether the UE supports Type6Gap. It is per FR capability. two IEs can be present in UECapability for NR. Absence of the IE for FR2 indicates the feature is not supported by the UE in the FR2. Presence of the IE for FR2 indicates the feature is supported by the UE in the FR and in TDD. Presence of the IE for FR1 indicates the feature is supported by the UE in the FR and in TDD and in FDD.

SupportedGapCombination indicates gap combinations supported by the UE among predefined gap combinations. It is a bit string with a predefined size. The predefined size is equal to the number of predefined gap combinations optionally supported. The leading/leftmost bit (bit 0) corresponds to the optional gap combination with the lowest index, the next bit corresponds to the optional gap combination with the next lowest index and so on. A gap combination consists of gap combination identifier (or index) and number of per-FR1 gaps and number of per-FR2 gaps and number of per-UE gaps. This IE indicates the number of measurement gaps simultaneously supported by the UE. It is per UE capability. The supported gap combinations are supported by the UE in FR1 and in FR2 and in FDD and in TDD.

A gap combination consists of gap combination identifier (or index) and number of per-FR1 gaps and number of per-FR2 gaps and number of per-UE gaps. Among the predefined gap combinations, some predefined gap combinations are mandatorily supported by the UE. Some predefined gap combinations are optionally supported by the UE. supportedGapCombination indicates which optional gap combinations are supported by the UE.

Example is shown in the table below. The range of the integer is between 0 and 2 (i.e., the highest value is 2 and the lowest value is 0; the maximum number of simultaneous gaps per FR is 2).

TABLE 4

| | # of simultaneous MG | | |
|---|---|---|---|
| Index | Per-FR1 | Per-FR2 | Per-UE |
| . . . | . . . | . . . | . . . |
| n | integer1 | integer2 | integer3 |
| n + 1 | integer4 | integer5 | integer6 |
| . . . | . . . | . . . | . . . |

Type7GapInfo1, if present, indicates UE supports preconfiguration of MGs in RRC signalling for PRS measurements and the use of DL MAC CE from the gNB to activate/deactivate the preconfigured MG for PRS measurements. This capability is related to DL MAC CE based type7Gap activation.

Type7GapInfo2, if present, indicates UE supports preconfiguration of MGs in RRC signalling for PRS measurements and the use of UL MAC CE to request the activation/deactivation of the preconfigured MG for PRS measurements. The UE can include this field only if the UE supports Type7GapInfo1. This capability is related to UL MAC CE based type7Gap activation request.

Type7GapInfo1 is reported to GNB only since MG activation using DL MAC CE lies in GNB's responsibility.

Type7GapInfo2 is reported to GNB in a RRC message and to LMF in a LPP message since LMF needs to provide GNB the relevant information if UE supports measurement gap activation request.

Alternatively, Type7GapInfo1 and Type7GapInfo2 are included in a UECapabilityInformation RRC message and Type7GapInfo3 is included in a ProvideCapabilities LPP message.

Type7GapInfo3, if present, indicates that the target device (i.e., the UE) supports low latency measurement gap activation request for DL-PRS measurements. This capability is related to both UL MAC CE based type7Gap activation request and DL MAC CE based type7Gap activation since supporting measurement gap activation request implies supporting measurement gap activation.

UE supporting only Type7GapInfo1 (i.e. UE who included only Type7GapInfo1 in UECapabilityInformation) does not include Type7GapInfo3 in ProvideCapabilities LPP message.

UE supporting both Type7GapInfo1 and Type7GapInfo2 (i.e. UE who included both Type7GapInfo1 and Type7GapInfo2 in UECapabilityInformation) includes Type7GapInfo3 in ProvideCapabilities LPP message.

DL/UL MAC CE processing is quicker than DL/UL RRC message because MAC CE is simpler to decode/encode. In that sense, use of DL/UL MAC CE can be considered low latency activity.

The ProvideCapabilities LPP message is transmitted to the LMF through GNB when LMF requests it. It is often before location service is started.

UECapabilityInformation is transmitted via SRB1 and ProvideCapabilities LPP message is transmitted in SRB2.

Based on reported UE capabilities, GNB determines configurations to be applied to the UE.

BWP-SwitchingDelay defines whether the UE supports DCI and timer based active BWP switching delay type1 or type2. It indicates one of type1 and type2. It is per UE capability. The indicated bwp-SwitchingDelay is supported by the UE in FR1 and in FR2 and in FDD and in TDD.

In 2A-13, GNB transmits UE first RRC message. first RRC message includes configuration information for gap request. Configuration information for gap request includes one of followings: needForGapsConfigNR, needForGapsConfigNR2, needForGapsConfigNR3, musim-AssistanceConfig and needFortype6GapConfig. needForGapsConfigNR and needForGapsConfigNR2 and needForGapsConfigNR3 can be included in RRCReconfiguration message or in RRCResume message. musim-AssistanceConfig and needForType6GapConfig can be included in otherConfig in RRCReconfiguration message.

NeedForGapsConfigNR contains configuration related to the reporting of measurement gap requirement information. needForGapsConfigNR includes a requestedTargetBandFilterNR. The requestedTargetBandFilterNR indicates the target NR bands that the UE is requested to report the gap requirement information. The requestedTargetBandFilterNR consists of one or more frequency band indicators.

NeedForGapsConfigNR2 indicates whether UE is allowed to provide NeedForGapsInfoNR2. This IE is enumerated with a single value "True". If this IE is absent, UE is not allowed to provide NeedForGapsInfoNR2. If this IE is present, UE is allowed to provide NeedForGapsInfoNR2.

NeedForGapsConfigNR3 indicates whether UE is allowed to provide NeedForGapInfoNR3. This IE is enumerated with a single value "True". If this IE is absent, UE is not allowed to provide NeedForGapInfoNR3. If this IE is present, UE is allowed to provide NeedForGapInfoNR3.

If RRCReconfiguration message or RRCResume message includes needForGapInfoNR or if needForGapInfoNR has been setup and has not been released, needForGapsConfigNR2 and needForGapInfoNR3 can be included in the RRCReconfiguration message or in the RRCResume message.

NeedForType6GapConfig indicates whether UE is configured to request for type6gap activation/deactivation and to provide preferred type6Gap pattern. This IE is enumerated with a single value "True". If this IE is absent, UE is not configured to provide preferred type6Gap pattern (or preference on type6Gap). If this IE is present, UE is configured to provide preferred type6Gap pattern (or preference on type6Gap).

MUSIM-AssistanceConfig includes a gapRequestProhibitTimer field. the gapRequestProhibitTimer is enumerated with values. Each value corresponds to length of duration in a unit of seconds.

In 2A-15, UE checks whether gap-request is needed. UE generates gap request information if so.

UE consider itself to be configured to provide the measurement gap requirement information of NR target bands, if the RRCReconfiguration message includes the needForGapInfoNR and if needForGapInfoNR is set to setup.

UE consider itself to be configured to provide the measurement gap requirement information of NR target bands, if the RRCResume message includes the needForGapInfoNR and if needForGapInfoNR is set to setup.

Condition-group-1 is fulfilled, if the RRCReconfiguration message was received via SRB1 but not within mrdc-SecondaryCellGroup or E-UTRA RRCConnectionReconfiguration or E-UTRA RRCConnectionResume, and if the UE is configured to provide the measurement gap requirement information of NR target bands, and if the RRCReconfiguration message includes the needForGapsConfigNR.

Condition-group-2 is fulfilled if the RRCResume message includes the needForGapsConfigNR.

If condition-group-1 is fulfilled or condition-group-2 is fulfilled, UE include the needForGapsInfoNR in the second RRC message and set the contents as follows:

UE includes intraFreq-needForGap and set the gap requirement information of intra-frequency measurement for each NR serving cell. UE sets either gap or no-gap for each serving cell.

UE includes an entry in interFreq-needForGap and set the gap requirement information for that band if requestedTargetBandFilterNR is configured, for each supported NR band that is also included in requestedTargetBandFilterNR. UE sets either gap or no-gap for each supported NR band.

If condition-group-1 is fulfilled and the RRCReconfiguration message includes needForGapsInfoNR2, or if condition-group-2 is fulfilled and the RRCResume message includes needForGapsInfoNR2, UE includes the needForGapsInfoNR2 in the second RRC message and set the contents as follows:

The second RRC message is RRCReconfigurationComplete if condition-group-1 was fulfilled. The second message is RRCResumeComplete if condition-group-2 was fulfilled.

UE includes intraFreq-needForGap2 and set the interruption requirement information (i.e., whether ncsg is required) of intra-frequency measurement for each NR serving cell. UE sets either ncsg or no-ncsg for each serving cell.

UE includes an entry in interFreq-needForGap2 and set the interruption requirement information for that band if requestedTargetBandFilterNR is configured, for each supported NR band that is also included in requestedTargetBandFilterNR. UE sets either ncsg or no-nscg for each supported NR band.

If condition-group-1 is fulfilled and if the RRCReconfiguration message includes needForGapsInfoNR3 and if only one serving cell is configured to the UE (i.e., UE is not configured with carrier aggregation; UE is configured with single carrier) as consequence of reconfiguration, UE includes the needForGapsInfoNR3 in the second RRC message and set the contents as follows:

UE includes bwpNeedForGap and set the gap requirement information for each DL BWP of PCell (or SpCell).

If condition-group-2 is fulfilled and if the RRCResume message includes needForGapsInfoNR3 and if only one serving cell is configured to the UE (i.e., UE is not configured with carrier aggregation; UE is configured with single carrier) as consequence of RRC connection resumption, UE includes the needForGapsInfoNR3 in the second RRC message and set the contents as follows:

UE includes bwpNeedForGap and set the gap requirement information for each DL BWP of PCell (or SpCell).

UE consider itself to be configured to provide MUSIM assistance information, if the received otherConfig includes musim-AssistanceConfig and if musim-AssistanceConfig is set to setup.

If UE is configured to provide MUSIM assistance information and if UE needs the Type5Gap, UE initiate transmission of UEAssistanceInformation as follows:

If UE has a preference for Type5Gap, UE includes musim-GapRequestList in the UEAssistanceInformation.

If UE determines that type6Gap request is needed, UE generates a type6 request MAC CE. The type6 request MAC CE can includes an information on ratio between the length of type6Gap and the repetition period of type6Gap. If transmission power sum should be decreased a lot, higher ratio is reported.

Alternatively, if UE is configured to provide its preference on type6Gap and if the UE did not transmit a UEAssistanceInformation with type6Gap-Preference since it was configured to provide its preference on type6Gap information, UE initiates transmission of UEAssistanceInformation.

If UE is configured to provide its preference on type6Gap and if the UE transmitted a UEAssistanceInformation with type6Gap-Preference since it was configured to provide its preference on type6Gap and if the current type6Gap preference is different from the one indicated in the last transmission of the UEAssistanceInformation, UE initiates transmission of UEAssistanceInformation.

If UE is configured to provide its preference on type6Gap and if the UE transmitted a UEAssistanceInformation with type6Gap-Preference since it was configured to provide its preference on type6Gap and if type6Gap is not required, UE initiates transmission of UEAssistanceInformation.

If transmission of the UEAssistanceInformation message is initiated to provide preference on type6Gap, UE includes Type6Gap-Preference IE in the UEAssistanceInformation.

If Type6Gap is required, UE includes a Type6Gap-bitmap in the Type6Gap-Preference IE.

If Type6Gap is not required, UE does not include a Type6Gap-bitmap in the Type6Gap-Preference IE.

UE transmits the UEAssistanceInformation to the base station.

NeedForGapsInfoNR consists of intraFreq-needForGap and interFreq-needForGap. NeedForGapsInfoNR is used to indicate the measurement gap requirement information of the UE for NR target bands.

IntraFreq-needForGap field includes NeedForGapsIntraFreqlist IE. This field indicates the measurement gap requirement information for NR intra-frequency measurement.

NeedForGapsIntraFreqlist consists of one or more NeedForGapsIntraFreq. NeedForGapsIntraFreq consists of servCellId and gapIndicationIntra. servCellId indicates the serving cell which contains the target SSB (associated with the initial DL BWP) to be measured. gapIndicationIntra indicates whether measurement gap is required for the UE to perform intra-frequency SSB based measurements on the concerned serving cell. “gap” indicates that a measurement gap is needed if any of the UE configured BWPs do not contain the frequency domain resources of the SSB associated to the initial DL BWP. “no-gap” indicates a measurement gap is not needed to measure the SSB associated to the initial DL BWP for all configured BWPs.

InterFreq-needForGap field includes NeedForGapsBandlistNR. This field indicates the measurement gap requirement information for NR inter-frequency measurement.

NeedForGapsBandlistNR consists of one or more NeedForGapsNR. NeedForGapsNR consists of bandNR and gapIndication. bandNR indicates the NR target band to be measured. gapIndication indicates whether measurement gap is required for the UE to perform SSB based measurements on the concerned NR target band while NR-DC or NE-DC is not configured. The UE determines this information based on the resultant configuration of the RRCReconfiguration or RRCResume message that triggers this response. Value gap indicates that a measurement gap is needed, value no-gap indicates a measurement gap is not needed.

NeedForGapsInfoNR2 consists of intraFreq-needForGap2 and interFreq-needForGap2. NeedForGapsInfoNR2 is used to indicate the interruption requirement information of the UE for NR target bands. Alternatively, this IE is used to indicate type4Gap (i.e., network controlled small gap) requirement information of the UE for NR target bands.

IntraFreq-needForGap2 field includes one or more gapIndication2 IEs. Each of one or more gapIndication2 IE in intraFreq-needForGap2 indicates the interruption requirement (or type4Gap requirement) information for NR intra-frequency measurement with respect to a specific serving cell.

InterFreq-needForGap2 field includes one or more gapIndication2 IEs. Each of one or more gapIndication2 IE in interFreq-needForGap2 indicates the interruption requirement (or type4Gap requirement) information for NR inter-frequency measurement with respect to a specific frequency band.

GapIndication2 is enumerated with three values: “gap” and “ncsg” and “nogap-noncsg”.

If gapIndication2 is set to “ncsg” for a serving cell, ncsg (or type4Gap) is required for the UE to perform intra-frequency SSB measurement on the concerned serving cell.

If gapIndication2 is set to “ncsg” for a frequency band, ncsg (or type4Gap) is required for the UE to perform SSB based measurement on the concerned target band.

If gapIndication2 is set to “gap” for a serving cell, type1Gap or type2Gap or type3Gap is required for the UE to perform intra-frequency SSB measurement on the concerned serving cell.

If gapIndication2 is set to “gap” for a frequency band, type1Gap or type2Gap or type3Gap is required for the UE to perform SSB based measurement on the concerned target band.

If gapIndication2 is set to “nogap-noncsg” for a serving cell, neither type1Gap nor type2Gap nor type3Gap nor type4Gap is required for the UE to perform intra-frequency SSB measurement on the concerned serving cell.

If gapIndication2 is set to “nogap-noncsg” for a frequency band, neither type1Gap nor type2Gap nor type3Gap nor type4Gap is required for the UE to perform SSB based measurement on the concerned target band.

NeedForGapsInfoNR3 consists of a bwpNeedForGap. NeedForGapsInfoNR3 is used to indicate the measurement gap requirement information of DL BWPs configured for the UE.

BWPNeedForGap field includes a BIT STRING. The size of the BIT STRING is equal to the number of DL BWPs configured for the UE in the PCell. Alternatively, the size of the BIT STRING is fixed to a specific value such as 4.

The leading/leftmost bit (bit 0) corresponds to the DL BWP with lowest index (or BWP 0). The next bit corresponds to the DL BWP with next lowest index (or BWP 1) and so on. Value 1 indicates type2Gap is required for the UE to perform measurement in the corresponding DL BWP. Value 0 indicates type2Gap is not required for the UE to perform measurement in the corresponding DL BWP. The measurement can be intra-frequency measurement based on SSB or intra-frequency measurement based on CSI-RS.

MUSIM-GapRequestList consists of MUSIM-GapRequestList IE. This IE indicate the MUSIM gap (i.e., type5Gap) requirement information.

MUSIM-GapRequestList IE includes one or two or three MUSIM-GapRequestInfo IE. The reason to limit to three in maximum is because configuring a single aperiodic gap and two periodic gaps is a common scenario with consideration of MUSIM gap usage.

MUSIM-GapRequestInfo includes RequestedMusim-GapType and RequestedMusim-GapOffset and Requested-Musim-GapLength and RequestedMusim-GapRepetition-Period and RequestedMusim-GapNumber.

RequestedMusim-GapType is enumerated with a single value of “aperiodic”. If this IE is present in MUSIM-GapRequestInfo and this IE indicates “aperiodic”, aperiodic musim-gap is required. If this IE is absent in MUSIM-GapRequestInfo, periodic musim-gap is required.

Alternatively, RequestedMusim-GapType is enumerated with a single value of "periodic". If this IE is present in MUSIM-GapRequestInfo and this IE indicates "periodic", periodic musim-gap is required. If this IE is absent in MUSIM-GapRequestInfo, aperiodic musim-gap is required.

Alternatively, if RequestedMusim-GapRepetitionPeriod is present in MUSIM-GapRequestInfo, periodic musim-gap is required. If this IE is absent in MUSIM-GapRequestInfo, aperiodic musim-gap is required.

Alternatively, if RequestedMusim-GapRepetitionPeriod in MUSIM-GapRequestInfo is set to a specific value like 0, aperiodic musim-gap is required. If RequestedMusim-GapRepetitionPeriod in MUSIM-GapRequestInfo is set to other value, periodic musim-gap is required.

Alternatively, if RequestedMusim-GapNumber is present in MUSIM-GapRequestInfo, aperiodic musim-gap is required. If this IE is absent in MUSIM-GapRequestInfo, periodic musim-gap is required.

RequestedMusim-GapOffset1 and RequestedMusim-GapOffset2 indicate the preferred musim-Gap starting time point.

RequestedMusim GapLength1 and RequestedMusim-GapLength2 indicate the preferred musim-Gap length.

RequestedMusim-GapRepetitionPeriod1 and Requested-Musim-GapRepetitionPeriod2 indicate the preferred repetition period.

RequestedMusim-GapNumber indicates the preferred number of aperiodic musim-Gap.

If the requested gap is periodic gap, RequestedMusim-GapOffset1 and RequestedMusim-GapLength1 and RequestedMusim-GapRepetitionPeriod1 are included.

If the requested gap is aperiodic gap, RequestedMusim-GapOffset2 and RequestedMusim-GapLength2 and RequestedMusim-GapRepetitionPeriod2 and Requested-Musim-GapNumber are included.

RequestedMusim-GapOffset1 is an integer between 0 and 159. RequestedMusim-GapOffset2 is an integer between 0 and 10239.

RequestedMusim-GapLength1 is enumerated with eight values: ms1Dot5, ms3, ms3dot5, ms4, ms5dot5, ms6, ms10, ms20.

RequestedMusim-GapLength2 is enumerated with four values: ms32, ms64, ms128, ms256.

RequestedMusim-GapRepetitionPeriod1 is enumerated with four values: ms20, ms40, ms80, ms160.

RequestedMusim-GapRepetitionPeriod2 is enumerated with four values: ms64, ms128, ms256, ms512.

RequestedMusim-GapRepetitionPeriod1 is enumerated with four values: one, two, four, eight.

Type6Gap-Preference IE may include Type6Gap-bitmap IE or may include no sub-level IE.

The Type6Gap-bitmap is 4 bit. Each bit corresponds to a specific Type6Gap pattern. The first bit corresponds to a first Type6Gap pattern, the second bit corresponds to a second Type6Gap pattern and so on. Each of the first Type6Gap pattern and the second Type6Gap pattern and the third Type6Gap pattern is associated with a specific gap length and a specific gap repetition periodicity respectively.

The fourth Type6Gap pattern is associated with two gap lengths. The first gap length is applicable when the SCS of the active UL BWP of a first cell is 15 KHz or 30 KHz and the second gap length is applicable when the SCS of the active UL BWP of a first cell is 60 KHz or 120. The first cell is the SpCell of the UE. The first cell could be the serving cell with the shortest SCS among the configured serving cells in FR2. The first cell could be the serving cell with the longest SCS among the configured serving cells in FR2.

UE determines which type6Gap is required based on uplink transmission power situation and sets the corresponding bit accordingly.

In 2A-17, UE transmits GNB second RRC message.

If the first RRC message was RRCResume message, the second RRC message is RRCResumeComplete message. The RRCResumeComplete message can include either NeedForGapsInfoNR or NeedForGapsInfoNR and Need-ForGapsInfoNR2 or NeedForGapsInfoNR and NeedFor-GapsInfoNR3.

If the first RRC message was RRCReconfiguration message, and if UE consider itself to be configured to provide the measurement gap requirement information, the second RRC message is RRCReconfigurationComplete message. The RRCReconfigurationComplete message can include either NeedForGapsInfoNR or NeedForGapsInfoNR and NeedForGapsInfoNR2 or NeedForGapsInfoNR and Need-ForGapsInfoNR3.

If the first RRC message was RRCReconfiguration message, and if UE consider itself to be configured to provide MUSIM assistance information or configured to provide its preference on type6Gap, the second RRC message is UEAssistanceInformation message.

The RRCReconfigurationComplete message includes same transaction-identifier as the transaction-identifier included in RRCReconfiguration message.

The RRCResumeComplete message includes same transaction-identifier as the transaction-identifier included in RRCResume message.

UEAssistanceInformation message does not include transaction-identifier.

GNB receives the second message and determines gap configurations for the UE.

In 2A-19, GNB transmits UE third RRC message to indicate gap configuration.

The third message can be RRCReconfiguration message.

To configure Type1Gap or Type2Gap or Type3Gap or Type4Gap or Type7Gap, GNB includes MeasConfig IE in the RRCReconfiguration message. The MeasConfig IE specifies measurements to be performed by the UE. The MeasConfig IE includes measGapConfig IE.

MeasGapConfig IE may include a gapFR2 field and a gapFR1 field and a gapUE field and a PosMeasGapPreConfigToAddModList field and a PosMeasGapPreConfigToReleaseList field and a gapToAddModList field and a gap-ToReleaseList field.

GapFR2 and gapFR1 and gapUE are defined as SetupRelease. If gapFR2(or gapFR1 or gapUE) is set to "setup", a gapConfig IE is included in the gapFR2(or gapFR1 or gapUE) and a FR2-gap (or FR1-gap or UE-gap) is setup. If gapFR2(or gapFR1 or gapUE) is set to "release", corresponding gapConfig is released.

GapToReleaseList consist of one or more MeasGapId IEs. gapToAddModList consist of one or more GapConfig1 IEs.

PosMeasGapPreConfigToReleaseList consist of one or more MeasGapId2 IEs. PosMeasGapPreConfigToAddMod-List consist of one or more GapConfig2 IEs.

During per-UE measurement gaps, UE does not conduct reception/transmission from/to the NR serving cells across FR1 and FR2 except the reception of signals used for RRM measurement(s), PRS measurement(s) and the signals used for random access procedure.

During per-FR1 measurement gaps, UE does not conduct reception/transmission from/to the FR1 NR serving cells except the reception of signals used for RRM measurement(s), PRS measurement(s) and the signals used for random access procedure.

During per-FR2 measurement gaps, UE does not conduct reception/transmission from/to the FR2 NR serving cells except the reception of signals used for RRM measurement(s), PRS measurement(s) and the signals used for random access procedure.

GapFR2 and gapFR1 and gapUE are used to configure a type1Gap.

GapToAddModList is used to configure one or more Type2Gaps or Type3Gaps or Type4Gaps. PosMeasGapPreConfigToAddModList is used to configure one or more Type7Gaps.

A gapConfig IE indicates the time pattern of the type1Gap. A gapConfig IE includes a gapOffset and a mgl1 and a mgrp and a mgta and a mgl2.

A gapConfig1 IE indicates the time pattern of the type2/3/4gap. A gapConfig1 IE includes measGapId and gapType and gapOffset and mgl3 and mgrp and mgta and type2Indicator and type4Indicator.

A gapConfig2 IE indicates the time pattern of the type7gap. A gapConfig2 IE includes measGapId2 and gapType and gapOffset and mgl3 and mgrp and mgta. GapOffset indicates an integer between 0 and 159 (i.e., highest mgrp−1). Mgl1 is enumerated with six values: ms1Dot5 and ms3 and ms3dot5 and ms4 and ms5dot5 and ms6. value ms1Dot5 corresponds to 1.5 ms. value 3 ms corresponds to 3 ms and so on.

Mgl2 is enumerated with two values: ms10 and ms20. mgl and mgl2 indicate the length of gap. If both mgl and mgl2 are included in a gapConfig, mgl2 is applied and mgl is ignored.

Mgl3 is enumerated with eight values: ms1Dot5 and ms3 and ms3dot5 and ms4 and ms5dot5 and ms6 and ms10 and ms20.

Mgl3 is union of mgl1 and mgl2.

Mgrp is enumerated with four values: ms20, ms40, ms80 and ms160.

Mgta IE is enumerated with three values: ms0, ms0dot25 and ms0dot5. mgta IE indicates the measurement gap timing advance (or interruption timing advance in case of Type4Gap) in ms.

GapType indicates the type of this measurement gap. Value perUE indicates that it is a per UE measurement gap, value perFR1 indicates that it is an FR1 measurement gap, and value perFR2 indicates that it is an FR2 measurement gap.

Type4Indicator is enumerated with a single value of "True". If this IE is present in the GapConfig1, The GapConfig1 is the configuration of type4Gap.

Type2Indicator is enumerated with a single value of "True". If this IE is present in the GapConfig1, The GapConfig1 is the configuration of type2Gap.

If a GapConfig1 includes neither type4Indicator nor type2Indicator, GapConfig is the configuration of type3Gap.

A measGapId IE is an integer between 1 and 8. A measGapId identifies a measurement gap configuration of a type2Gap or a type3Gap or a type4Gap. Hence different measGapId is allocated across the types of measurement gaps and frequency regions of measurement gaps (i.e. a per-FR1 type3Gap and a per-FR2 type3Gap shall be allocated with different measGapId).

A measGapId2 IE is an integer between 1 and 16. A measGapId2 identifies a type7 measurement gap configuration. A measGapId and a measGapId2 are allocated independently (i.e. a measGapId x and a measGapId2 x are associated with two different measurement gap configurations).

To configure Type5Gap, GNB includes musim-GapConfig IE in the RRCReconfiguration message. musim-GapConfig IE indicates the gap configuration of Type5Gap that applies to all frequencies. a musim-GapConfig IE includes a single musim-GapToReleaseList IE and a single musim-GapToAddModList IE. A musim-GapToReleaseList consists of one or more musim-GapId. A musim-GapToAddModList consists of one or more musim-GapToAddMod IEs.

A musim-GapToAddMod IE can include musim-gapId, musim-Starting-SFN-AndSubframe, musim-GapLength and musim-GapRepetitionAndOffset.

A musim-gapId IE is an integer between 0 and 1.

MUSIM-Starting-SFN-AndSubframe IE indicates the gap starting position for the aperiodic type5 gap. It includes starting SFN and starting subframe.

MUSIM-GapRepetitionAndOffset indicates the gap repetition period in ms and gap offset in number of subframes. It includes an integer chosen from a integer set. The highest value of the integer set is equal to the repetition period-1. The integer indicates the starting offset of the gap. For example, a integer chosen from a integer set with highest value of 1279 indicates that the repetition period is 1280 ms. UE determines the offset based on the signaled integer and the repetition period based on the highest integer of the integer set.

If musim-gap is periodic gap, musim-GapLength and musim-GapRepetitionAndOffset are present.

If musim-gap is aperiodic gap, musim-Starting-SFN-AndSubframe is present.

To configure Type6Gap, GNB includes Type6GapConfig IE in the RRCReconfiguration message. Type6GapConfig IE indicates the gap configuration of Type6Gap that applies to a specific FR (i.e. FR2). Type6GapConfig IE includes a gapOffset field and a ugl field and a ugrp field.

Ugl field indicates one of ms0dot125 and ms0dot25 and ms0dot5 and ms1. ms0dot125 corresponds to 0.125 ms, ms0dot25 corresponds to 0.25 ms and so on. ugl indicates a length of the type6 gap.

Ugrp field indicates the gap repetition period of the type6 gap. ugrp field indicates one of ms5 and ms20 and ms40 and ms160.

Type6GapRefServCellIndicator field indicates a serving cell identifier whose SFN and subframe is used for type6Gap calculation for gap pattern. If this field is absent, UE uses PCell for this purpose.

In 2A-21, UE setup the gap based on the gap information received in 2A-17.

If the third message includes measGapConfig IE, UE determines the gap to be setup according to the gapType.

For each GapConfg1 received in gapToAddModList, UE setup the gap configuration indicated by the GapConfig1 in accordance with gapOffset, i.e., the first subframe of each gap occurs at an SFN and subframe meeting the following condition:

$$\text{SFN mod } T = \text{FLOOR}(\text{gapOffset}/10);$$

Subframe=gapOffset mod 10;

With T=mgrp/10;

UE apply the specified timing advance mgta to the gap occurrences calculated above (i.e., the UE starts the measurement mgta ms before the gap subframe occurrences).

UE apply the measurement gap as per UE measurement gap, FR1 measurement gap, or FR2 measurement gap according to the gapType indicated by the GapConfig1.

UE associate the measurement gap with the measGapId indicated by the GapConfig1;

For each GapConfg2 received in PosMeasGapPreConfig-ToAddModList, UE setup the gap configuration indicated by the GapConfig2 in accordance with gapOffset, i.e., the first subframe of each gap occurs at an SFN and subframe meeting the following condition:

SFN mod $T$=FLOOR(gapOffset/10);

Subframe=gapOffset mod 10;

With T=mgrp/10;

UE apply the specified timing advance mgta to the gap occurrences calculated above (i.e., the UE starts the measurement mgta ms before the gap subframe occurrences).

UE apply the measurement gap as per UE measurement gap, FR1 measurement gap, or FR2 measurement gap according to the gapType indicated by the GapConfig.

UE associate the measurement gap with the measGapId2 indicated by the GapConfig2; Periodic Type5Gap is established as below.

UE setup the gap configuration indicated by the musim-GapConfig in accordance with the received musim-GapRepetitionAndOffset-, i.e., the first subframe of each gap occurs at an SFN and subframe meeting the following condition:

SFN mod $T$=FLOOR(INTEGER1/10);

Subframe=gapOffset mod 10;

With T=MUSIM-PERIODICITY/10;

INTEGER1 is the integer indicated by musim-GapRepetitionAndOffset. MUSIM-PERIODICITY is equal to the highest value of the corresponding integer set plus one. The corresponding integer set is the one where INTEGER1 is chosen.

Aperiodic Type5Gap is established as below.

UE setup the gap configuration indicated by the musim-GapConfig in accordance with musim-Starting-SFN-And-Subframe, i.e., the first subframe of the aperiodic gap occurs at an SFN and subframe indicated in musim-Starting-SFN-AndSubframe.

Type6Gap is established as below.

UE setup the gap configuration indicated by the type6GapConfig in accordance with the received gapOffset, i.e., the first subframe of each gap occurs at an SFN and subframe meeting the following condition:

SFN mod $T$=FLOOR(gapOffset/10);

Subframe=gapOffset mod 10 if ugrp is larger than 5 ms;

Subframe=gapOffset or gapOffset+5 ifugrp is equal to 5 ms;

With T=CEIL(ugrp/10);

Each gap occurs (or begins) at the first static uplink slot determined from the first subframe (i.e., each gap occurs/begins at the first static uplink slot starting from the first slot of the first subframe).

For each FR1, FR2, and per UE measurement gap that is setup, if the measurement gap is configured by GapConfig 1 and type2Indicator in the corresponding GapConfig 1 is present, UE determine whether the measurement gap is activated or not based on the activated BWP and/or activated SCells.

For each FR1, FR2, and per UE measurement gap that is setup, if the measurement gap is configured by GapConfig2, UE consider the measurement gap is deactivated.

For each FR1, FR2, and per UE measurement gap that is setup, if the measurement gap is configured by GapConfig 1 and type2Indicator in the corresponding GapConfig 1 is not present or if the measurement gap is configured by GapConfig, UE consider the measurement gap is activated.

For each type5Gap that is setup, UE consider the gap is activated.

For each type6Gap that is setup, UE consider the gap is activated.

In short, type 1Gap and type3Gap and type4Gap and type5Gap and type6Gap are considered activated when they are configured by a RRC message. Type2Gap is either activated or deactivated depending on the active BWP and/or active SCel when it is configured by a RRC message. Type7Gap is considered deactivated when it is configured by a RRC message.

All the Type1Gap and Type3Gap and Type4Gap and Type5Gap are immediately used (i.e., used from the next occurrence) once the corresponding gap configurations are setup.

One or more Type2Gap configurations can be setup. However only subset of Type2Gaps is used depending on the currently active downlink BWP.

One or more Type7Gap configurations can be setup. However only one of Type7Gaps is used when DL MAC CE activate the Type7Gap.

Only one Type1Gap or only one Type4Gap can be configured and used as FR1-gap. one or two Type3Gap can be configured and used simultaneously as FR1-gap.

Only one Type1Gap or only one Type4Gap can be configured as FR2-gap. one or two Type3Gap can be configured and used simultaneously as FR2-gap.

Only one Type1Gap or only one Type4Gap can be configured and used simultaneously as UE-gap. One or more Type2Gap can be configured as UE-gap. One or more Type5Gap can be configured as UE-gap. Only one Type2Gap can be used as UE-gap. One or more Type5Gap can be used as UE-gap simultaneously.

A certain IE (or field) being enumerated with x and y means that the IE (or field) can indicate one of x and y.

In 2A-23, UE applies gap operations during a gap. UE performs normal operations during non-gap.

TABLE 5

| Gap type | Applied gap operation |
|---|---|
| Type1Gap | Gap Operation 1 during the gap |
| Type2Gap | Gap Operation 1-1 during the gap |
| Type3Gap | Gap Operation 1-1 during the gap |
| Type4Gap | Gap Operation 2 during interruption length<br>Gap operation 3 during measurement length |
| Type5Gap | Gap Operation 4 during the gap |
| Type6Gap | Gap Operation 6 during the gap |
| Type7Gap | Gap Operation 1-2 during the gap |

A gap being active means the relevant gap operation being applied. A gap being inactive means the relevant gap operation not being applied and normal operation being applied as if gap is not configured.

Gap operation comprises data-activity-action-group and non-data-activity-action-group.

TABLE 6

| Gap operation type | data-activity-action-group | non-data-activity-action-group |
|---|---|---|
| Gap operation 1 | For serving-carrier-group, not performing the transmission of HARQ feedback, SR, and CSI in the uplink slots and in the | performing SSB based measurement on measurement-object-group. |

TABLE 6-continued

| Gap operation type | data-activity-action-group | non-data-activity-action-group |
|---|---|---|
| | uplink symbols of flexible slots during the gap. not reporting SRS in the uplink slots and in the uplink symbols of flexible slots during the gap. not transmitting on UL-SCH except for Msg3 or the MSGA payload in the uplink slots and in the uplink symbols of flexible slots during the gap. not monitoring the PDCCH in the downlink slots and in the downlink symbols of flexible slots during the gap except period X. not receiving on DL-SCH in the downlink slots and in the downlink symbols of flexible slots during the gap except period X. period X is when ra-ResponseWindow or the ra-ContentionResolutionTimer or the msgB-ResponseWindow is running | |
| Gap operation 1-1 | same data-activity-action-group as Gap operation 1 | performing SSB based measurement or CSI-RS based measurement or PRS based measurement on measurement-object-group. |
| Gap operation 1-2 | same data-activity-action-group as Gap operation 1 | performing PRS based measurement on a group of frequencies. The frequencies where PRS measurement is performed are indicated by LMF in a LPP message or indicated by GNB in a system information. |
| Gap operation 2 | same data-activity-action-group as Gap operation 1 | RF retuning |
| Gap operation 3 | For serving-carrier-group, performing the transmission of HARQ feedback, SR, and CSI in the uplink slots and in the uplink symbols of flexible slots during the gap. reporting SRS in the uplink slots and in the uplink symbols of flexible slots during the gap. transmitting on UL-SCH in the uplink slots and in the uplink symbols of flexible slots during the gap monitoring the PDCCH in the downlink slots and in the downlink symbols of flexible slots during the gap. receiving on DL-SCH in the downlink slots and in the downlink symbols of flexible slots during the gap. | same non-data-activity-action-group as Gap operation 1-1 |
| Gap operation 4 | same data-activity-action-group as Gap operation 1 | performing paging reception or system information reception for the other USIM |
| Gap operation 6 | For serving-carrier-group (i.e. FR2 serving cells), not performing the transmission of HARQ feedback and CSI during the gap. not reporting SRS during the gap. not transmitting on UL-SCH except for Msg3 or the MSGA payload and except for CG-PUSCH during the gap. performing transmission on PUCCH allocation for SR and on CG-PUSCH resource and PRACH resource | |

Type 1 gap and type 2 gap and type 3 gap and type 4 gap and type 5 gap and type7 gap consist with all types of slots (i.e. uplink slots and downlink slots and flexible slots indicated in tdd-UL-DL-ConfigurationCommon). A type 1 gap or a type 2 gap or a type 3 gap or a type 4 gap or a type 5 gap are consecutive in time within the respective gap (i.e. if the gap length is n ms, the distance between the starting point of the gap and the end point of gap is n ms) and consist with consecutive slots.

Type 6 gap consists with only static UL slots indicated in tdd-UL-DL-ConfigurationCommon. Type 6 gap could be non-consecutive in time (i.e. if the gap length is n ms, the distance between the starting point of the gap and the end point of gap could be longer than n ms) and consists with slots that could be non-consecutive with each other.

Time span of a gap is between the starting point of the gap and the end point of the gap.

During the time span of a type X gap (X is 1 or 2 or 3 or 4), UE is not required to (i.e. UE does not) conduct reception/transmission from/to the corresponding NR serving cells in the corresponding frequency range except the reception of signals used for RRM measurement(s) and the signals used for random access procedure.

During the time span of type 6 gap, UE is not required to (i.e. UE does not) conduct transmission to the corresponding NR serving cells in FR2 except for the signals used for random access procedure, CG-PUSCH (type 1 and 2) and PUCCH allocations for SR and LRR. During the time span of type 6 gap, UE conduct reception from the corresponding NR serving cell in FR2.

serving-carrier-group and measurement-object-group are determined as in table.

TABLE 7

| Gap Type | serving-carrier-group | measurement-object-group |
|---|---|---|
| Type1Gap | If the gap is FR2 gap, serving-carrier-group is serving carriers (or serving cells) on FR2. If the gap is FR1 gap, serving-carrier-group is serving carriers (or serving cells) on FR1. If the gap is UE gap, serving-carrier-group is all serving carriers (or serving cells) or serving carriers (or serving cells) on FR1 and FR2. | If the gap is FR2 gap, measurement-object-group is the measurement objects configured for FR2 frequencies. If the gap is FR1 gap, measurement-object-group is the measurement objects configured for FR1 frequencies. If the gap is UE gap, measurement-object-group is the measurement objects configured for FR1 frequencies and FR2 frequencies. |
| Type2Gap | Same as Type1Gap | Same as Type1Gap |
| Type3Gap | Same as Type1Gap | Regardless of whether the gap is FR1 gap or FR2 gap or UE gap, measurement-object-group is determined based on the associated measurement objects. If the gap is FR2 gap, only the measurement objects on FR2 can be associated with the gap. If the gap is FRI gap, only the measurement objects on FR1 can be associated with the gap. |
| Type4Gap | Same as Type1Gap | Same as Type1Gap |
| Type5Gap | Type5Gap is UE gap. serving-carrier-group is all serving carriers (or serving cells) or serving carriers (or serving cells) on FR1 and FR2. | Type5Gap is UE gap. measurement-object-group is the measurement objects configured for FR1 frequencies and FR2 frequencies. |
| Type6Gap | Type6Gap is FR2 gap | N/A (UE is not required to perform measurement) |
| Type7Gap | Same as Type1Gap | Measurement-object-group is a group of frequencies where PRS is configured. |

In 2A-25, GNB performs transmission and reception with the UE considering the activated gaps.

Type2Gap is described in more detail below.

A Type2Gap is associated with a DL BWP according to type2GapStatus1 for the DL BWP. A BWP-DownlinkDedicated IE can include a type2GapStatus1 IE.

The type2GapStatus1 is a bit string. type2GapStatus1 indicates whether the type2 gaps are activated or deactivated upon the switch to this BWP. The first/leftmost bit corresponds to the measurement gap with gap ID 1, the second bit corresponds to measurement gap with gap ID 2, and so on. Value 0 indicates that the corresponding type2 gap is deactivated while value 1 indicates that the corresponding type2 gap is activated. The UE shall ignore the bit if the corresponding measurement gap is not a type2 gap.

A SCellConfig IE can include a type2GapStatus2 IE.

type2GapStatus2 is a bit string. Type2GapStatus2 indicates whether the type2 gaps are activated or deactivated while this SCell is deactivated. The first/leftmost bit corresponds to the measurement gap with gap ID 1, the second bit corresponds to measurement gap with gap ID 2, and so on. Value 0 indicates that the corresponding type2 gap is deactivated while value 1 indicates that the corresponding type2 gap is activated. The UE shall ignore the bit if the corresponding measurement gap is not a type2 gap.

One or more Type2gaps can be configured for a UE. Among the gaps, UE activates a specific gap. The specific gap is the gap determined from the type2GapStatus1 of the active DL BWP or the gap determined from the type2GapStatus2 of the active SCell.

Type2Gap switching occurs when BWP switching occurs. More specifically, BWP switching occurs in the following cases.

Upon configuring Type2Gaps and DL BWPs based on a received RRCReconfiguration message, UE activates a Type2Gap determined from the type2GapStatus1 of a DL BWP to be activated after RRC reconfiguration. If firstActiveDownlinkBWP is present in the RRCReconfiguration message, the DL BWP to be activated is the DL BWP indicated by firstActiveDownlinkBWP-Id in the RRCReconfiguration message. If firstActiveDownlinkBWP-Id is absent in the RRCReconfiguration message, the DL BWP to be activated in the DL BWP that was active before RRCReconfiguration message is received.

After activating a Type2Gap, UE may need to do gap switching (i.e., UE may need to deactivate the current active Type2Gap and to activate a new Type2Gap). For example, if UE receives uplink grant on PDCCH (DCI format 0_1 or 0_2) including a bandwidthpart indicator field indicating an UL BWP different from the current active UL BWP, UE determines that gap switching is needed if condition 1 and condition 2 are fulfilled.

Condition 1: If the SpCell of the UE is in unpaired spectrum (i.e., TDD spectrum); and Condition 2: If the active Type2Gap associated with the old DL BWP (DL BWP that is active before reception of the UL grant on PDCCH) is different from the Type2Gap to be activated upon switch to the DL BWP having the same BWP id as the UL BWP indicated by the bandwidthpart indicator of the UL grant.

If both conditions are fulfilled, UE deactivates the current Type2Gap and activates the Type2Gap associated with the DL BWP having the same BWP id as the UL BWP indicated by the bandwidthpart indicator of the UL grant. If no Type2Gap is associated with the DL BWP, no Type2Gap is activated.

If UE receives DL assignment on PDCCH (DCI format 1_1 or 1_2), UE determines gap switching is needed if condition 3 is fulfilled.

Condition 3: If the active Type2Gap associated with the old DL BWP is different from the Type2Gap to be activated upon switch to the DL BWP indicated by the bandwidthpart indicator of the DL assignment If condition 3 is fulfilled, UE deactivates the current Type2Gap and activates the Type2Gap determined from the type2GapStatus1 of the DL BWP indicated by the bandwidthpart indicator of the DL assignment. If type2GapStatus1 is not configured to the DL BWP, all the configured Type2Gaps are activated.

If the bwp-InactivityTimer associated with the active DL BWP expires, UE determines gap switching is needed if condition 4 is fulfilled.

Condition 4: If the active Type2Gap associated with the active DL BWP (old DL BWP) is different from the Type2Gap to be activated upon switch to the DL BWP to be activated If defaultDownlinkBWP-Id is configured, The DL BWP to be activated is the DL BWP indicated by the default-DownlinkBWP-Id.

If defaultDownlinkBWP-Id is not configured, The DL BWP to be activated is the DL BWP indicated by the initialDownlinkBWP.

If condition 4 is fulfilled, UE deactivates the current Type2Gap and activates the Type2Gap determined from the type2GapStatus1 of the DL BWP to be activated.

If Random Access procedure is initiated on a serving cell, UE determines gap switching is needed if condition 5 and condition 6 are fulfilled.

Condition 5: If PRACH occasions are not configured for the active UL BWP and if the serving cell is SpCell Condition 6: If the active Type2Gap associated with the active DL BWP (old DL BWP) is different from the Type2Gap to be activated upon switch to the DL BWP indicated by initialDownlinkBWP.

If condition 5 and 6 are fulfilled, UE deactivates the current Type2Gap and activates the Type2Gap associated with the DL BWP indicated by initialDownlinkBWP. If no Type2Gap is associated with the initial DL BWP, no Type2Gap is activated.

Alternatively, a BWP-DownlinkDedicated IE and a SCellConfig IE can include a deactivatedMeasGapBitmap IE respectively.

Each bit of The deactivatedMeasGapBitmap indicates the Type2GapStatus of each type2Gap.

One UE-Type2gap or one FR1-Type2gap or one FR2-Type2gap or one FR1-Type2gap and one FR2-Type2gap can be configured for the UE.

If Type2GapStatus of the active DL BWP of the PCell is set to a first value (e.g., deactivated), UE deactivates the Type2Gap for the PCell.

If Type2GapStatus of the active DL BWP of the PCell is set to a second value (e.g., activated), UE activates the Type2Gap for the PCell.

The other way is also possible.

If Type2GapStatus of the active DL BWP of the PCell is set to a first value (e.g., activated), UE activates the Type2Gap for the PCell.

If Type2GapStatus of the active DL BWP of the PCell is set to a second value (e.g., deactivated), UE deactivates the Type2Gap for the PCell.

The initial DL BWP is the BWP of which BWP-id is 0. The initial DL BWP is the BWP of which BWP-id is implicitly configured. The initial BWP is the BWP of which BWP-id is not associated with an explicit BWP-Id IE. The initial DL BWP is the BWP of which cell specific configuration is provided in SIB1 and UE specific configuration is provided in RRCReconfiguration message. DL BWPs other than the initial BWP are the BWP of which cell specific configuration and UE specific configuration are provided in RRCReconfiguration message.

Type2Gap switching occurs when SCell activation/deactivation occurs.

Upon configuring Type2Gaps and a SCell based on a received RRCReconfiguration message, UE activates a Type2Gap determined from the type2GapStatus2 of the SCell.

Upon reception of a first MAC CE activating or deactivating the SCell, UE activates a Type2Gap determined from the type2GapStatus2 of the SCell.

Upon expiry of sCellDeactivationTimer configured for the SCell, UE activates a Type2Gap determined from the type2GapStatus2 of the SCell.

Alternatively, upon configuring Type2Gaps and a SCell based on a received RRCReconfiguration message, UE deactivates one or two Type2Gap determined from the type2GapStatus2 of the SCell.

Upon reception of a MAC CE activating or deactivating the SCell, UE deactivates one or two Type2Gap determined from the type2GapStatus2 of the SCell.

Upon expiry of sCellDeactivationTimer configured for the SCell, UE deactivates one or two Type2Gap determined from the type2GapStatus2 of the SCell.

Type2Gap switching occurs when a second MAC CE activating a Type2Gap is received.

Upon receiving the second MAC CE, UE activates the type2Gap indicated in the second MAC CE.

When BWP switch occurs, which results in status change of Type2Gap (i.e. Type2Gap activation or deactivation or both), UE finishes type2Gap activation or deactivation within 5+x ms since BWP switch occur (i.e. since DCI reception or timer expiry). x is determined based at least part on bwp-SwitchingDelay and SCS of the BWPs as in table below.

TABLE 8

| shorter SCS between old BWP and the new BWP | slot length | Type 1 | Type 2 |
|---|---|---|---|
| 15 kHz | 1 ms | 1 ms | 3 ms |
| 30 kHz | 0.5 ms | 1 ms | 2.5 ms |
| 60 kHz | 0.25 ms | 0.75 ms | 2.25 ms |
| 120 kHz | 0.125 ms | 0.75 ms | 2.25 ms |

BWP-SwitchingDelay defines whether the UE supports DCI and timer based active BWP switching delay type1 or type2. It indicates one of type1 and type2.

When SCell is deactivated due to the first MAC CE reception, UE finishes type2Gap activation or deactivation within 5+y ms since the first MAC CE deactivating the SCell is received. y is determined based at least part on the timing when acknowledgement for the first MAC CE is transmitted.

y is equal to 3+y1 ms, where y1 is the timing between the first MAC CE transmission and the corresponding acknowledgement.

When SCell is deactivated due to the expiry of sCellDeactivationTimer, UE finishes type2Gap activation or deactivation within 5+y2 ms since the expiry of sCellDeactivationTimer. y2 is fixed to 3.

When SCell is activated or deactivated due to reception of RRCReconfiguration message, UE finishes type2Gap activation or deactivation within 5+z ms since the RRCReconfiguration message is received. z is 10 ms if RRCReconfiguration includes the configuration on PCell and does not includes the configuration on SCell addition/release. z is 16 ms if RRCReconfiguration includes the configuration on SCell addition/release.

The first MAC CE is SCell Activation/Deactivation MAC CE. The second MAC CE is Type2Gap L2 response MAC CE.

Type6Gap is described in more detail below.

The length of the type6Gap in terms of the number of slots is determined based on ugl field and type6GapRefServCellIndicator field. UE first determines the number of uplink slots from the gap length indicated by the ugl field and the SCS of the serving cell indicated by type6GapRefServCellIndicator. For example, if the gap length is 0.5 ms and UL SCS of the reference serving cell is 60 KHz, the number of slots for a type6Gap is 2 (=gap length/slot length of the reference serving cell). If type6GapRefServCellIndicator field is absent in type6GapConfig, UE determines the number of uplink slots based on ugl field and the SCS of the active UL BWP of the PCell.

Type6Gap starts in the nearest uplink slot from the reference subframe (or the first subframe). Type6Gap continues for consecutive n uplink slots. Depending on tdd-UL-DL-ConfigurationCommon, DL slots and flexible slots can exists between uplink slots (or within time span of uplink slots). Hence the actual length of type6Gap is determined by the number of uplink slots derived from type6GapLength field and the number of downlink slots that exist within the time span of the uplink slots and the number of flexible slots that exist within the time span of the uplink slots. UE performs normal downlink operation in the downlink slots and flexible slots within the Type6Gap. UE performs normal uplink operation in the flexible slots within the Type6Gap. UE stops any uplink operation in the uplink slots within the Type6Gap. UE does not perform uplink transmission of FR1 serving cells in the uplink slots during FR1 type6Gap. UE does not perform uplink transmission of FR2 serving cells in the uplink slots during FR2 type6Gap. UE does not perform uplink transmission of all serving cells in the uplink slots during UE type6Gap.

If Type7Gap needs to be updated or to be activated with regards to location measurement, UE moves to step 2A-27.

In 2A-27, UE transmits and GNB receives a type7Gap activation request message. The message could be either type7Gap L3 request message (type7Gap activation request RRC message) or type7Gap L2 request message (type7Gap activation request MAC CE).

If performing location measurements towards NR is started and the UE requires measurement gaps for these operations while measurement gaps are either not configured or not sufficient, and if type7Gaps are configured and the UE considers that at least one of type7Gap is sufficient for the location measurement when activated, UE initiates type7 gap activation request using UL MAC CE. The UL MAC CE is Type7Gap L2 request message.

If performing location measurements towards NR is started and the UE requires measurement gaps for these operations while measurement gaps are either not configured or not sufficient, and if type7Gaps are not configured, UE initiates the type7 gap activation request using UL RRC message that includes a measurementIndication field set to nr-PRS-Measurement.

If performing location measurements towards NR is started and the UE requires measurement gaps for these operations while measurement gaps are either not configured or not sufficient, and if type7Gaps are configured and the UE considers that none of type7Gap is sufficient for the location measurement when activated, UE initiates the type7 gap activation request using UL RRC message that includes a measurementIndication field set to nr-PRS-Measurement.

If location measurements towards NR is stopped and if there is an activated type7gap, UE initiates type7 gap deactivation request using UL MAC CE.

If location measurements towards NR is stopped and if there is no activated type7gap, UE triggers type7Gap L3 request procedure to initiate transmission of the type7Gap L3 request message that includes a measurementIndication field set to release.

If at least one type7Gap L2 request is triggered, UE cancel the already triggered type7Gap L2 request message, if any, and triggers new type7Gap L2 request message.

If Type7Gap L2 request message has been triggered, and not cancelled and if UL-SCH resources are available for a new transmission and these UL-SCH resources can accommodate the Type7Gap L2 request message plus its subheader as a result of logical channel prioritization, UE cancel triggered Type7Gap L2 request message and generates the Type7Gap L2 request message.

If Type7Gap L2 request message has been triggered, and not cancelled and if UL-SCH resources are not available for a new transmission, UE triggers a Scheduling Request for Type7Gap L2 request message without triggering BSR.

UE applies a first SR configuration to the scheduling request procedure triggered for Type7Gap L2 request message.

UE is configured with one or more SR configurations. The first SR configuration is selected from the one or more SR configurations implicitly or explicitly. UE performs scheduling_request_procedure_for_Type7Gap_L2_request.

In 2A-29, GNB transmits and UE receives a type7Gap activation response message. The message could be either type7Gap L3 response message (type7Gap activation response RRC message) or type7Gap L2 response message (type7Gap activation response MAC CE). If UE transmitted type7Gap L2 request message, GNB respond with type7Gap L2 response message. If UE transmitted type7Gap L3 request message, GNB respond with type7Gap L3 response message.

Upon the reception of the Type7Gap L2 response message, if the message indicates deactivation of a type7Gap UE deactivates the type7Gap and if the message indicates activation of a type7Gap UE activates the type7Gap.

In 2A-31, UE and GNB performs RRC_CONNECTED operation (e.g. data transmission/reception) according to the configured and activated gap.

During the RRC_CONNECTED operation, UE may detect some events and initiates RRC re-establishment procedure. The event includes detecting radio link failure, re-configuration with sync failure, integrity check failure and RRC connection reconfiguration failure.

Upon such failures, UE needs to re-establish the RRC connection in the new cell. To perform this task quickly, UE stops all other tasks like gap request or preference indication. Also, since gap operation restricts the UE activity, UE stops gap operation as well.

In 2A-33, UE performs RRC re-establishment procedure.

Upon initiation of RRC re-establishment procedure and before transmission RRCReestablishmentRequest in the selected suitable cell, UE releases configuration information for gap request such as needForGapsConfigNR, needForGapsConfigNR2, needForGapsConfigNR3, musim-AssistanceConfig and needFortype6Gap. UE also cancels any triggered type2Gap L2 request procedure and discard any type2Gap L2 request message. UE performs cell selection to find a new suitable cell.

Upon selecting a suitable cell, UE applies default MAC Cell Group configuration and CCCH configuration and initiates transmission of RRCReestablishmentRequest message.

The RRCReestablishmentRequest message includes a ue-Identity field and a shortMAC-I field and a reestablishment-Cause field.

UE re-establish PDCP and RLC of SRB1 and transmits RRCReestablishmentRequest via SRB0.

GNB receives the RRCReestablishmentRequest message and determines whether to reestablish the RRC connection based on the ue-Identity field and the shortMAC-I field and the reestablishmentCause field.

If GNB determines to reestablish RRC connection with the UE, GNB transmits RRCReestablishment message via SRB1.

UE receives the RRCReestablishment message via SRB1 and release the type x (x is 1 or 2 or 3 or 4 or 7) gap configurations indicated by measGapConfig and the type 5 gap configuration indicated by musim-GapConfig and type 6 gap configuration indicated by type6GapConfig.

UE transmits to GNB RRCReestablishmentComplete message to confirm that UE completes the procedure.

In short, UE releases gap request configuration at first point of time and UE release gap configuration at second point of time. UE can stop gap operation before releasing the configuration to facilitate quicker reestablishment. For example, UE can stop gap operation at first point of time or at third point of time.

The first point of time is after initiating RRC re-establishment procedure and before selecting a suitable cell (or before transmitting RRCReestablishmentRequest message via SRB0).

The second point of time is after receiving RRCReestablishment message via SRB1 and before transmitting RRCReestablishmentComplete message via SRB1.

The third point of time is after transmitting RRCReestablishmentRequest message via SRB0 and before receiving RRCReestablishment message via SRB1.

In the disclosure, 'mapped' and 'associated' and 'be related' are used interchangeably.

CellGroupConfig is used to configure a master cell group (MCG) or secondary cell group (SCG). A cell group comprises of one MAC entity, a set of logical channels with associated RLC entities and of a primary cell (SpCell) and one or more secondary cells (SCells). CellGroupConfig includes following fields: zero or one spCellConfig, zero or one or more SCellConfig.

SpCellConfig is parameters for the SpCell of this cell group (PCell of MCG or PSCell of SCG).

SpCellConfig includes following fields: a servCellIndex, a reconfigurationWithSync and a ServingCellConfig SCellConfig is parameters for the SCell. SCellConfig includes following fields: a sCellIndex, a ServingCellConfigCommon and a ServingCellConfig.

The SCellIndex is a short identity to identify an SCell.

The reconfigurationWithSync is parameters for the SpCell. If spCellConfig in CellGroupConfig in RRCReconfiguration includes reconfigurationWithSync, handover is initiated. The reconfigurationWithSync includes following fields: a ServingCellConfigCommon, a newUE-Identity, t304 and a rach-ConfigDedicated.

NewUE-Identity indicates the C-RNTI to be used in the target cell after handover.

ServingCellConfigCommon includes one DownlinkConfigCommon and two UplinkConfigCommon. One UplinkConfigCommon is for a NUL (normal uplink) and the other UplinkConfigCommon is for a SUL (supplementary uplink). UplinkConfigCommon for a SUL is located after UplinkConfigCommon is for a NUL.

DownlinkConfigCommon includes FrequencyInfoDL and BWP-DownlinkCommon. BWP-DownlinkCommon is for the initial DL BWP and includes PDCCH-ConfigCommon and PDSCH-ConfigCommon.

UplinkConfigCommon includes FrequencyInfoUL and TimeAlignmentTimer and BWP-UplinkCommon. BWP-UplinkCommon is for the initial UL BWP. BWP-UplinkCommon includes RACH-ConfigCommon and PUSCH-ConfigCommon and PUCCH-ConfigCommon and a plurality of RACH-ConfigCommon-fc.

DownlinkConfigCommon is a common downlink configuration of the serving cell. It consists of subfields such as FrequencyInfoDL and BWP-DownlinkCommon.

FrequencyInfoDL is a basic parameter of a downlink carrier. It consists of subfields such as a frequency band list and carrier bandwidth for each SCS.

BWP-DownlinkCommon is the configuration of the second downlink IBWP. It consists of subfields such as BWP, PDCCH-ConfigCommon, and PDSCH-ConfigCommon. The first IBWP has a frequency domain corresponding to the first CORESET #0 of the MIB and has subcarrier spacing indicated by the MIB. The first IBWP is the IBWP indicated by the MIB and receiving 1, the second IBWP is the IBWP indicated by the 1 and receiving the 2, paging, random access response message, and the like.

BWP is IE that configures general parameters of BWP. It consists of subfields such as locationAndBandwidth indicating the bandwidth and location of the BWP, and subcarrierSpacing indicating the SCS of the BWP.

ServingCellConfig includes a BWP-DownlinkDedicated (for the second initial downlink BWP) and zero or one or more BWP-Downlink IEs (for dedicate downlink BWPs) and a UplinkConfig IE (for normal uplink) and a UplinkConfig IE (for supplementary uplink). The UplinkConfig IE includes a BWP-UplinkDedicated (for the second initial uplink BWP) and zero or one or more BWP-Uplink IEs (for dedicate uplink BWPs).

A BWP-Downlink consists of a BWP-Id IE and a BWP-DownlinkCommon IE and a BWP-DownlinkDedicated IE.

A BWP-Uplink consists of a BWP-Id IE and a BWP-UplinkCommon IE and a BWP-UplinkDedicated IE.

A BWP-DownlinkDedicated consists of a PDCCH-Config and a PDSCH-Config. The PDCCH-Config is used to configure UE specific PDCCH parameters such as control resource sets (CORESET), search spaces and additional parameters for acquiring the PDCCH. The PDSCH-Config is used to configure the UE specific PDSCH parameters.

A BWP-UplinkDedicated consists of a PUCCH-Config and a PUSCH-Config. The PUCCH-Config is used to configure UE specific PUCCH parameters. The PUSCH-Config is used to configure the UE specific PUSCH parameters.

PDCCH-ConfigCommon is the cell-specific PDCCH parameters of the initial BWP of the second cell. It consists of subfields such as controlResourceSetZero, commonControlResourceSet, searchSpaceZero, commonSearchSpaceList, searchSpaceOtherSystemInformation, pagingSearchSpace, and ra-SearchSpace.

ControlResourceSetZero is defined as an integer between 0 and 15. It indicates one of the predefined CORESET #0 configurations. The controlResourceSetZero included in the MIB corresponds to the first CORESET #0, and the controlResourceSetZero included in the PDCCH-ConfigCommon of the servingCellConfigCommon of SIB1 corresponds to the second CORESET #0.

SearchSpaceZero is defined as an integer between 0 and 15. It indicates one of the predefined SS #0 configurations. The searchSpaceZero included in the MIB corresponds to the first SS #0, and the controlResourceSetZero included in the PDCCH-ConfigCommon of the servingCellConfigCommon of SIB1 corresponds to the second SS #0.

CommonControlResourceSet is a common CORESET defined by ControlResourceSet IE. It defines an additional CORESET that can be used for paging reception, random access response reception, system information reception, etc.

CommonSearchSpaceList is a list of common SSs. The common SS may be used for paging reception, random access response reception, system information reception, and the like.

SearchSpaceOtherSystemInformation is defined by the SS identifier IE. If it is 0, the second SS #0 is indicated, and if it is a value other than 0, one of the SSs defined in commonSearchSpaceList is indicated.

PagingSearchSpace is defined by the SS identifier IE. If it is 0, the second SS #0 is indicated, and if it is a value other than 0, one of the SSs defined in commonSearchSpaceList is indicated.

RA-SearchSpace is defined by the SS identifier IE. If it is 0, the second SS #0 is indicated. If it is a value other than 0, one of the SSs defined in the commonSearchSpaceList is indicated.

PDCCH-ConfigCommon configures one or more TYPE 1 CSSs (Common Search Space) and a TYPE2 CSS.

TYPE1 CSS is applicable to and used by both RRC_INACTIVE UE and RRC_IDLE UE. The configuration of TYPE1 CSS is predefined (if it is searchSpaceZero) or referred by one of commonSearchSpaceList. searchSpaceZero and searchSpaceOtherSystemInformation and pagingSearchSpace and ra-SearchSpace are TYPE1 CSS. CommonSearchSpaceList includes one or more SearchSpace IE.

TYPE2 CSS is applicable to and used by only RRC_INACTIVE UE. The type2 CSS is configured by a SearchSpace2 IE.

SDT-SearchSpace is TYPE2 CSS.

PDCCH-Config is used to configure UE specific PDCCH parameters such as control resource sets (CORESET), search spaces and additional parameters for acquiring the PDCCH.

It consists of fields such as controlResourceSetToAddModList, searchSpacesToAddModList and tpc-SRS.

ControlResourceSetToAddModList field includes a list of UE specifically configured Control Resource Sets (CORESETs) to be used by UE.

SearchSpacesToAddModList field includes a list of UE specifically configured Search Spaces.

TPC-SRS field enables and configures reception of group TPC commands for SRS. tpc-SRS field includes SRS-TPC-CommandConfig IE. SRS-TPC-CommandConfig is used to configure UE for extracting TPC commands for SRS from a group-TPC messages on DCI.

SearchSpace IE defines how/where to search for PDCCH candidates The SearchSpace IE includes following fields: a searchSpaceId, a controlResourceSetId, monitoringSlotPeriodicityAndOffset, a duration, searchSpaceType etc.

controlResourceSetId indicates the CORESET applicable for this SearchSpace. monitoringSlotPeriodicityAndOffset indicates slots for PDCCH Monitoring configured as periodicity and offset. duration indicates number of consecutive slots that a SearchSpace lasts in every occasion. searchSpaceType indicates whether this is a common search space or a UE specific search space as well as DCI formats to monitor for.

SearchSpaceId is used to identify Search Spaces. It is an integer between 0 and 39.

PDSCH-ConfigCommon is cell-specific PDSCH parameters of the initial BWP of the second cell. It consists of a pdsch-TimeDomainAllocationList. The pdsch-TimeDomainAllocationList is a list composed of a plurality of pdsch-PDSCH-TimeDomainAllocation is a time domain relationship between the PDCCH and the PDSCH. It consists of subfields such as K0 and startSymbolAndLength. K0 is the slot offset between the DCI and the scheduled PDSCH. startSymbolAndLength is an index indicating a valid start symbol and length combination.

PCCH-Config is configuration related to paging. It consists of sub-fields such as the base station paging period, PF-related parameters, and PO-related parameters.

BCCH-config is a configuration related to system information. It consists of subfields such as modificationPeriodCoeff indicating the length of the modification period.

UplinkConfigCommonSIB is a common uplink configuration of the serving cell. It consists of subfields such as frequencyInfoUL, initialUplinkBWP, and timeAlignmentTimerCommon.

FrequencyInfoUL-SIB is a basic parameter of the uplink carrier. It consists of subfields such as a frequency band list and carrier bandwidth for each SCS.

BWP-UplinkCommon is the configuration of the second uplink IBWP. It consists of subfields such as BWP, rach-ConfigCommon, pusch-ConfigCommon, and pucch-ConfigCommon.

PDSCH-Config IE is used to configure UE specific PDSCH parameters. It consists of dataScramblingIdentityPDSCH field and pdsch-TimeDomainAllocationList field and mcs-Table field and others.

DataScramblingIdentityPDSCH field indicates identifier used to initialize data scrambling (c_init) for PDSCH MCS-Table field indicates which MCS table UE shall use for PDSCH. If the field is absent UE applies the value 64QAM. value 64QAM means the MCS table for 64QAM. value 256QAM means the MCS table for 256QAM.

RACH-ConfigCommon is the cell-specific random access parameter of the initial BWP of the second cell. It consists of subfields such as prach-ConfigurationIndex, msg1-FrequencyStart, preambleReceivedTargetPower, ra-ResponseWindow, preambleTransMax, msg1-SubcarrierSpacing, rsrp-ThresholdSSB, rsrp-ThresholdSSB-SUL, featueCombination and ra-ContentionResolutionTimer.

PUSCH-ConfigCommon is cell-specific PUSCH parameters of the initial BWP of the second cell. It consists of subfields like pusch-TimeDomainAllocationList. The pusch-TimeDomainAllocationList is a list composed of a plurality of pusch-TimeDomainAllocations.

PUSCH-Pusch-TimeDomainAllocation is a time domain relationship between the PDCCH and the PUSCH. It consists of subfields such as K2 and startSymbolAndLength. K2 is the slot offset between the DCI and the scheduled PUSCH. startSymbolAndLength is an index indicating a valid combination of start symbol and length.

The IE PUSCH-Config is used to configure UE specific PUSCH parameters applicable to a the initial BWP of the second cell.

It consists of dataScramblingIdentityPUSCH field, pusch-PowerControl field, pusch-TimeDomainAllocationList field, mcs-Table field and frequencyHopping field and others.

DataScramblingIdentityPUSCH field indicates an identifier used to initialize data scrambling (c_init) for PUSCH. If the field is absent, UE applies the physical cell ID.

MCS-Table field indicates which MCS table UE shall use for PUSCH. If the field is absent UE applies the value 64QAM.

FrequencyHopping indicates frequency hopping scheme to be applied. The value intraSlot enables 'Intra-slot frequency hopping' and the value interSlot enables 'Inter-slot frequency hopping'. If the field is absent, frequency hopping is not configured.

PUSCH-PowerControl is used to configure UE specific power control parameter for PUSCH. It consists of p0-AlphaSets field and p0-NominalWithoutGrant field.

P0-AlphaSets field includes a plurality of P0-PUSCH-AlphaSet IEs. A P0-PUSCH-AlphaSet IE comprises a p0-PUSCH-AlphaSetId field and a p0 field.

P0 field indicates P0 value for PUSCH with grant (except msg3) in steps of 1DB. When the field is absent UE applies the value 0.

P0-NominalWithoutGrant field indicates P0 value for UL grant-free PUSCH (configured grant based PUSCH).

PUCCH-ConfigCommon is the cell-specific PUCCH parameter of the initial BWP of the second cell. It consists of subfields such as pucch-ResourceCommon and p0-norminal.

PUCCH-ResourceCommon is an index corresponding to a cell-specific PUCCH resource parameters. One index corresponds to a PUCCH format, a PUCCH time period, a PUCCH frequency period, a PUCCH code, and the like.

P0-norminal is a power offset applied during PUCCH transmission. Defined as an integer between −202 and 24 in increments of 2. The unit is dBm.

PUCCH-ConfigCommon is used to configure UE specific PUCCH parameters. It consists of fields such as dl-DataToUL-ACK field and resourceSetToAddModList field and others.

DL-DataToUL-ACK field includes a list of timing for given PDSCH to the DL ACK.

ResourceSetToAddModList includes a list for adding PUCCH resource sets.

TDD-UL-DL-ConfigurationCommon is cell specific TDD UL/DL configuration. It consists of subfields such as referenceSubcarrierSpacing, pattern1, and pattern2.

ReferenceSubcarrierSpacing is the reference SCS used to determine the time domain boundary in the UL-DL pattern.

Pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

DL-UL-TransmissionPeriodicity indicates the period of the DL-UL pattern.

NRofDownlinkSlots indicates the number of consecutive full DL slots in each DL-UL pattern.

NRofDownlinkSymbols indicates the number of consecutive DL symbols from the beginning of the slot following the last full DL slot.

NRofUplinkSlots indicates the number of consecutive full UL slots in each DL-UL pattern.

NRofUplinkSymbols indicates the number of consecutive UL symbols at the last time point of a slot preceding the first full UL slot UE can be configured with zero or more SR configurations.

Each SR configuration corresponds to one or more logical channels and/or to SCell beam failure recovery and/or to Type7Gap L2 request. Each logical channel, SCell beam failure recovery may be mapped to zero or one SR configuration, which is configured by RRC. Type7Gap L2 request may be mapped to at least one SR configuration. The SR configuration of the logical channel that triggered a BSR or the SCell beam failure recovery or Type2Gap L2 request is considered as corresponding SR configuration for the triggered SR.

A scheduling_request_procedure_for_Type7Gap_L2_request is as follows.

If an SR is triggered by Type7Gap L2 request and there are no other SRs pending corresponding to the same SR configuration, the UE/MAC entity shall set the SR_COUNTER of the corresponding SR configuration to 0.

When an SR is triggered, it shall be considered as pending until it is cancelled.

If the SR is triggered by Type7Gap L2 request and a MAC PDU is transmitted and the MAC PDU includes a Type2Gap L2 request, UE cancel the pending SR and stop the sr-ProhibitTimer.

Only PUCCH resources on a BWP which is active at the time of SR transmission occasion are considered valid.

If the MAC entity/UE has no valid PUCCH resource configured for the pending SR, UE initiates a Random Access procedure on the SpCell and cancel the pending SR.

If the MAC entity/UE has valid PUCCH resource configured for the pending SR and if sr-ProhibitTimer is not running at the time of the SR transmission occasion for SR configured and if the PUCCH resource for the SR transmission occasion does not overlap with a measurement gap and if SR_COUNTER is smaller than sr-TransMax, UE performs following actions; UE signal the SR on one valid PUCCH resource for SR and UE increments SR_COUNTER by 1 and UE starts the sr-ProhibitTimer.

The valid PUCCH resource configured for the SR triggered by Type7Gap L2 request is the PUCCH resource on the active UL BWP and associated with the SR configuration selected for Type7Gap L2 request.

The MAC-CellGroupConfig is used to configure MAC parameters for a cell group, including DRX and SR configurations.

The MAC-CellGroupConfig includes a schedulingRequestToAddModList field (List of Scheduling Request configurations to add or modify) and a schedulingRequestToReleaseList field (List of Scheduling Request configurations to release) and a schedulingRequestID-BFR-SCell field (the scheduling request configuration applicable for BFR on SCell) and a schedulingRequestID-Type7GapRequest field (the scheduling request configuration applicable for Type7Gap request.

The schedulingRequestToAddModList field comprises one or more SchedulingRequestToAddMod IEs.

A SchedulingRequestToAddMod IE comprises following fields: schedulingRequestId, sr-ProhibitTimer (Prohibit timer for SR transmission on PUCCH), sr-TransMax (Maximum number of SR transmissions)

The schedulingRequestToReleaseList field comprises one or more schedulingRequestId.

The PUCCH-Config is used to configure UE specific PUCCH parameters (per BWP).

The PUCCH-Config comprises following fields.

A resourceSetToAddModList field (Lists for adding PUCCH resource sets; comprising one or more PUCCH-ResourceSet) and a resourceSetToReleaseList field (Lists for releasing PUCCH resource sets; comprising one or more PUCCH-ResourceSetId) and a spatialRelationInfoToAddModList field (Configuration of the spatial relation between a reference RS and PUCCH; comprising one or more PUCCH-SpatialRelationInfo) and a spatialRelationInfoToReleaseList field (Lists of spatial relation configurations between a reference RS and PUCCH to be released by the UE; comprising one or more PUCCH-SpatialRelationInfold).

A resourceToAddModList field (Lists for adding PUCCH resources applicable for the UL BWP and serving cell in which the PUCCH-Config is defined; comprising one or more PUCCH-Resource) and a resourceToReleaseList field (Lists for releasing PUCCH resources applicable for the UL BWP and serving cell in which the PUCCH-Config is defined; comprising one or more PUCCH-ResourceId).

A schedulingRequestResourceToAddModList field (List for adding scheduling request resource for the UL BWP and serving cell in which the PUCCH-Config is defined) and a schedulingRequestResourceToReleaseList field (List for releasing scheduling request resource for the UL BWP and serving cell in which the PUCCH-Config is defined).

The SchedulingRequestResourceConfig determines physical layer resources on PUCCH where the UE may send the dedicated scheduling request. A SchedulingRequestResourceConfig is associated with a SchedulingRequestConfig. A SchedulingRequestResourceConfig comprises following fields.

schedulingRequestResourceId field (used to identify scheduling request resources on PUCCH), schedulingRequestID field (The ID of the SchedulingRequestConfig that uses this scheduling request resource), periodicityAndOffset (SR periodicity and offset in number of symbols or slots) and resource (ID of the PUCCH resource in which the UE shall send the scheduling request. The actual PUCCH-Resource is configured in PUCCH-Config of the same UL BWP and serving cell as this SchedulingRequestResourceConfig).

The PUCCH-ResourceSet comprises following fields. A pucch-ResourceSetId field and a resourceList field (one or more PUCCH-ResourceId).

The PUCCH-Resource comprises following fields. A pucch-ResourceId field (Identifier of the PUCCH resource), a startingPRB field, a nrofSymbols field (the number of symbols used per PUCCH resource) and a nrofPRBs field (the number of PRBs used per PUCCH resource).

The PUCCH-SpatialRelationInfo is used to configure the spatial setting for PUCCH transmission and the parameters for PUCCH power control. The PUCCH-SpatialRelationInfo comprises following fields: pucch-SpatialRelationInfold, servingCellId, referenceSignal and pucch-PathlossReferenceRS-Id.

ServingCellId field indicates the serving cell where the referenceSignal is configured. If this field is absent, UE applies the ServCellId of the serving cell in which this PUCCH-SpatialRelationInfo is configured.

ReferenceSignal field indicates a SSB-Index or a NZP-CSI-RS-ResourceId.

pucch-PathlossReferenceRS-Id field indicates the pucch-PathlossReferenceRS to be used for PUCCH power control.

A spatial setting for a PUCCH transmission by a UE is provided by a PUCCH-SpatialRelationInfo.

The BFR MAC CE and Truncated BFR MAC CE have a variable size. They include a bitmap and in ascending order based on the ServCellIndex, beam failure recovery information i.e. octets containing candidate beam availability indication (AC) for SCells indicated in the bitmap.

The BFR MAC CE consists of following fields.

SP field indicates beam failure detection for the SpCell of this MAC entity. The SP field is set to 1 to indicate that beam failure is detected for SpCell.

Ci field indicates beam failure detection and the presence of an octet containing the AC field for the SCell with ServCellIndex i.

AC field indicates the presence of the Candidate RS ID field in this octet. If at least one of the SSBs with SS-RSRP above rsrp-ThresholdBFR amongst the SSBs in candidateBeamRSSCellList or the CSI-RS s with CSI-RSRP above rsrp-ThresholdBFR amongst the CSI-RS s in candidateBeamRSSCellList is available, the AC field is set to 1; otherwise, it is set to 0. If the AC field set to 1, the Candidate RS ID field is present. If the AC field set to 0, R bits are present instead;

Candidate RS ID field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RS s in candidateBeamRSSCellList. Index of an SSB or CSI-RS is the index of an entry in candidateBeamRSSCellList corresponding to the SSB or CSI-RS. Index 0 corresponds to the first entry in the candidateBeamRSSCellList, index 1 corresponds to the second entry in the list and so on. The length of this field is 6 bits.

A Type7Gap L2 request message is identified by MAC subheader with one-octet eLCID and has a fixed size of one octet. A Type7Gap L2 request message consists of 3 R bits and a A/D field and a MG ID field.

MG ID field contains measGapId2−1. The measGapId2 is the identifier of the Type7Gap. The length of the field is 4 bits. A value n in MG ID field corresponds to a measGapId2 n+1.

A/D field indicates the activation or deactivation of the Positioning Measurement Gap (i.e., Type7Gap). The field is set to 1 to indicate activation, otherwise it indicates deactivation. The length of the field is 1 bit.

If A/D field is set to 1 and MG ID field is set to n−1, UE request activation of type7Gap n.

If A/D field is set to 0 and MG ID field is set to m−1, UE request deactivation of type7Gap m.

The subheader of a Type7Gap L2 request message consists of two R bits and a 6 bit LCID field and a 8 bit eLCID field. The LCID field is set to a first value indicating a 8 bit extended logical channel ID field follows. The first value is 34. If LCID field is set to a second value, a 16 bit extended logical channel ID field follows. UE sets the LCID field to the first value for Type7Gap L2 request message. 8 bit eLCID field is set to a third value indicating that the type of corresponding MAC CE is type7Gap L2 request message. The third value in eLCID field corresponds to the LCID value calculated from the third value plus a constant. It is to avoid the ambiguity between LCID value indicated by LCID field and LCID value indicated by eLCID field. The constant is the maximum value of LCID field plus one (i.e. 64). For example, if the third value in eLCID field is 249, it indicates the type of the MAC CE corresponds to LCID value of 313 (=249+64).

A Type7Gap L2 response message is identified by MAC subheader with one-octet eLCID and has a fixed size. A Type7Gap L2 response message include one or more response information. A response information includes a A/D field (n−1) R bits and a measGapId field.

A Type7Gap L2 response message consists of 3 R bits and a A/D field and a MG ID field.

MG ID field contains measGapId2-1. The measGapId2 is the identifier of the Type7Gap. The length of the field is 4 bits. A value n in MG ID field corresponds to a measGapId2 n+1.

A/D field indicates the activation or deactivation of the Positioning Measurement Gap. The field is set to 1 to indicate activation, otherwise it indicates deactivation. The length of the field is 1 bit.

If A/D field is set to 1 and MG ID field is set to n−1, GNB commands activation of type7Gap n.

If A/D field is set to 0 and MG ID field is set to m−1, GNB commands deactivation of type7Gap m.

The subheader of a Type7Gap L2 response message is consists of one R bit and one F field and a LCID field and a 8 bit eLCID field and a L field. The LCID field is set to a first value indicating a 8 bit extended logical channel ID field follows. The first value is 34. 8 bit eLCID field is set to a fourth value indicating that the type of corresponding MAC CE is type7Gap L2 response message. The fourth value in eLCID field corresponds to the LCID value calculated from the fourth value plus a constant.

Type7Gap L3 request message includes a measurementIndication field that can be set to release or set to setup. If it is set to setup, the field includes a LocationMeasurementInfo IE. The LocationMeasurementInfo IE includes a dl-PRS-PointA field and RepetitionAndOffset field and a PRS-length field.

dl-PRS-PointA field indicates the absolute radio frequency channel number of the carrier for which UE needs to perform PRS measurement.

RepetitionAndOffset field indicates the gap periodicity in ms and offset in number of subframes of the requested gap.

PRS-length field indicates the gap length of the requested gap.

UE shall set the contents of Type7Gap L3 request message according to the required gap and trigger BSR to request resource for Type7Gap L3 request message. The triggered BSR can trigger SR.

The priority of type7Gap L2 request message is higher than the priority of type7Gap L3 request message.

The subheader of a Type7Gap L3 request message is consists of one R bit and one F field and a LCID field and a L field. The LDID field is set to 1 to indicate that the MAC SDU is SRB1 data.

Type7Gap L3 response message includes a measGapConfig. The measGapConfig may include a gapConfig1 IE to set up type4Gap corresponding to the requested measurement gap requirements. The measGapConfig may include a gapConfig2 IE to set up type7Gap corresponding to the requested measurement gap requirements. In this case, Type2Gap L2 response message can be sent to UE shortly to activate the type7Gap.

PUCCH Spatial Relation Activation/Deactivation MAC CE has following fields.

Serving Cell ID field indicates the identity of the Serving Cell for which the MAC CE applies. The length of the field is 5 bits;

BWP ID field indicates a UL BWP for which the MAC CE applies. The length of the BWP ID field is 2 bits;

PUCCH Resource ID field contains an identifier of the PUCCH resource, which is to be activated with a spatial relation indicated by Spatial Relation Info ID field in the subsequent octet. The length of the field is 7 bits.

Spatial Relation Info ID field contains PUCCH-SpatialRelationInfold−1 where PUCCH-SpatialRelationInfold is the identifier of the PUCCH Spatial Relation Info in PUCCH-Config in which the PUCCH Resource ID is configured. The length of the field is 6 bits;

SCell Activation/Deactivation MAC CE has a fixed size and consists of a single octet containing seven C-fields.

Ci field indicates the activation/deactivation status of the SCell with SCellIndex i. The Ci field is set to 1 to indicate that the SCell with SCellIndex i shall be activated. The Ci field is set to 0 to indicate that the SCell with SCellIndex i shall be deactivated;

Logical channels shall be prioritised in accordance with the following order (highest priority listed first):

- MAC CE for C-RNTI, or data from UL-CCCH;
- MAC CE for (Enhanced) BFR;
- MAC CE for (Extended) BSR, with exception of BSR included for padding;
- MAC CE for (Enhanced) Single Entry PHR, or MAC CE for (Enhanced) Multiple Entry PHR;
- MAC CE for Positioning Measurement Gap Activation/Deactivation Request (Type7Gap L2 request message);
- data from any Logical Channel (including data from SRB1 and SRB2), except data from UL-CCCH;
- MAC CE for BSR included for padding;
- When UE receives a DL data transmission (including a MAC CE) from GNB at a first point of time, UE performs relevant action at the time point as following.

If the MAC CE is Type7Gap L2 response message and A/D field is set to 1, UE finishes the activation of a Type7Gap until a second time point1. Alternatively, UE finishes the activation of the Type7Gap at a second time point2. Second time point2 is between the first time point and the second time point1.

If the MAC CE is Type7Gap L2 response message and A/D field is set to 0, UE finishes the deactivation of a Type7Gap until a second time point1. Alternatively, UE finishes the deactivation of the Type7Gap at a second time point2. Second time point2 is between the first time point and the second time point1.

Second time point2 is a time point after (the end of) the first time point and before (the end of) the second time point1. Second time point2 can be equal to the second time point1. Second time point2 cannot be equal to the first time point.

The second time point1 is at first time point+a first variable time period+a first constant time period.

The first variable time period is determined by the timing of DL data transmission and the corresponding acknowledgement. The first variable time period is varying depending on TDD UL/DL configuration and a DCI scheduling the DL data transmission.

The first constant time period is applied to ensure UE processing for the MAC CE. The first constant time period is fixed and common to a plurality of UEs.

If the MAC CE is SCell Activation/Deactivation MAC CE and deactivation of a SCell is indicated by the MAC CE and a type2Gap is to be activated as a result of SCell deactivation, UE finishes the activation of a Type2Gap until a third time point1. Alternatively, UE finishes the activation of the Type7Gap at a third time point2. The third time point2 is between the first time point and the third time point1.

If the MAC CE is SCell Activation/Deactivation MAC CE and deactivation of a SCell is indicated by the MAC CE and a type2Gap is to be deactivated as a result of SCell deactivation, UE finishes the deactivation of a Type2Gap until a third time point1. Alternatively, UE finishes the activation of the Type7Gap at a third time point2. The third time point2 is between the first time point and the third time point1.

Third time point2 is after (the end of) the first time point and before (the end of) the third time point1. Third time point2 can be equal to the third time point1. Third time point2 cannot be equal to the first time point.

The third time point1 is at first time point+second variable time period+second constant time period.

The second variable time period is determined by the SCell deactivation delay. SCell deactivation is completed at first time point+second variable time period. The second variable time period is varying depending on TDD UL/DL configuration and a DCI scheduling the DL data transmission.

The second constant time period is applied to ensure UE processing for the MAC CE. The second constant time period is fixed and common to a plurality of UEs. The first constant time period and the second constant time period can be same or different.

If the MAC CE is PUCCH Spatial Relation Activation/Deactivation MAC CE and a UL spatial relation for a PUCCH resource configured for SR changes, UE applies the target UL spatial relation at a fourth time point.

The fourth time point is at first time point+a first variable time period+a third variable time period ($T_{SSB}$)+a third constant time period The third variable time period is determined by the periodicity of the SSB configured for L1-RSRP measurement. The third variable time period is varying depending on the periodicity of SSB in the cell.

The third constant time period is applied to ensure UE processing for the MAC CE. The third constant time period is fixed and common to a plurality of UEs. The first constant time period and the third constant time period can be same or different.

If UE receives BWP switching request at DL slot n (or at first time point) and the BWP switching results in status change of type2Gap, UE finishes the activation of a Type2Gap at a fifth time point1.

The fifth time point1 is at first time point+a fourth variable period+a fourth constant time period.

The fourth variable period is determined based at least part on bwp-SwitchingDelay and SCS of the BWPs as in table x The fourth constant time period is to ensure UE processing for type2Gap switching.

The operations of terminal are listed below.

Terminal receives a RRCReconfiguration message.

the RRCReconfiguration message includes one or more gap configuration information and one or more DL BWP configuration information and firstActiveDownlinkBWP.

each of one or more gap configuration information includes a measGapId and a type2Indicator and a gapOffset and a mgl and a mgrp.

each of one or more DL BWP configuration information includes a bwp-Id and a parameter for bandwidth of BWP and a parameter for SCS of the BWP and a deactivatedMeasGapList.

Terminal determines the active DL BWP based at least in part on the firstActiveDownlinkBWP-id.

Terminal determines a first gap is to be active based at least in part on deactivatedMeasGapList of the active DL BWP if the first gap is not indicated in the deactivatedMeasGapList.

Terminal receives a UL grant, the UL grant includes a bandwidth part indicator.

Terminal determines a second gap is to be active based if the second gap is not indicated in a deactivatedMeasGapList of a DL BWP having the same bwp-Id as the bwp-Id indicated in the bandwidth part indicator of the UL grant.

Terminal activates the second gap at a first point of time, the first point of time is determined based at least in part on a first constant and a first variable, and the first variable is a second constant if the SCS of the BWP is 15 kHz or 30 kHz and is a third constant if the SCS of the BWP is 60 kHz or 120 kHz.

The first constant and the second constant and the third constant are 5 and 1 and 0.75 respectively.

Terminal receives a RRCReconfiguration message,

The RRCReconfiguration message includes one or more gap configuration information and one or more DL BWP configuration information and optionally firstActiveDownlinkBWP-id and a bwp-InactivityTimer and a defaultDownlinkBWP-Id, each of one or more gap configuration information includes a measGapId and a type2Indicator and a gapOffset and a mgl and a mgrp, each of one or more DL BWP configuration information includes a bwp-Id and a parameter for bandwidth of BWP and a parameter for SCS of the BWP and a deactivatedMeasGapList.

Terminal determines the active DL BWP based at least in part on the firstActiveDownlinkBWP-id Terminal determines a first gap is to be active based at least in part on a deactivatedMeasGapList of the active DL BWP if the first gap is not indicated in the deactivatedMeasGapList.

Terminal starts the bwp-InactivityTimer.

Terminal determines a second gap is to be active based at least in part on a deactivatedMeasGapList of a DL BWP associated with the defaultDownlinkBWP-Id when bwp-InactivityTimer expires.

Terminal activates the second gap at a first point of time, the first point of time is determined based at least in part on a first constant and a first variable, and the first variable is a second constant if the SCS of the BWP is 15 kHz or 30 kHz and is a third constant if the SCS of the BWP is 60 kHz or 120 kHz The first constant and the second constant and the third constant are 5 and 1 and respectively.

Terminal receives a RRCReconfiguration message, the RRCReconfiguration message includes one or more gap configuration information and one or more SCell configuration information and one or more DL BWP configuration information and optionally firstActiveDownlinkBWP-id and a bwp-InactivityTimer and a defaultDownlinkBWP-Id, each of one or more gap configuration information includes a measGapId and a type2Indicator and a gapOffset and a mgl and a mgrp, each of one or more SCell configuration information includes a serving cell index and a serving cell configuration and a sCellDeactivationTimer and a deactivatedMeasGapList2, each of one or more DL BWP configuration information includes a bwp-Id and a parameter for bandwidth of BWP and a parameter for SCS of the BWP and a deactivatedMeasGapList.

Terminal determines the active DL BWP based at least in part on the firstActiveDownlinkBWP-id.

Terminal determines a first gap is to be active based at least in part on deactivatedMeasGapList of the active DL BWP if the first gap is not indicated in the deactivated-MeasGapList.

Terminal determines to deactivate a SCell.

Terminal determines a second gap is to be active based at least in part on a deactivatedMeasGapList2 of the SCell.

Terminal activates a second gap at a second point of time, the second point of time is determined based at least in part on a first constant and a second variable.

The second variable is determined based at least in part on the timing between the first MAC CE transmission and the corresponding acknowledgement if the SCell is deactivated by the first MAC CE.

The second variable is a fourth constant if the SCell is deactivated by expiry of sCellDeactivationTimer.

The second variable is a fifth constant if the SCell is deactivated by a first DL RRC message, the first DL RRC message is RRCReconfiguration including the configuration of SCell addition.

The first constant and the fourth constant and the fifth constant are 5 and 3 and 16 respectively.

Terminal receives a SIB 1.

The SIB1 includes a DL BWP configuration information for a initial DL BWP and a UL BWP configuration information for a initial UL BWP.

The UL BWP configuration for the initial UL BWP includes configuration information on PRACH occasions.

Terminal receives a RRCReconfiguration message.

The RRCReconfiguration message includes one or more gap configuration information and one or more DL BWP configuration information and one or more UL BWP configuration information and firstActiveDownlinkBWP-id and a bwp-InactivityTimer and a defaultDownlinkBWP-Id.

Each of one or more gap configuration information includes a measGapId and a type2Indicator and a gapOffset and a mgl and a mgrp.

Each of one or more DL BWP configuration information includes a bwp-Id and a parameter for bandwidth of BWP and a parameter for SCS of the BWP and a deactivated-MeasGapList.

Each of one or more UL BWP configuration information includes a bwp-Id and a parameter for bandwidth of BWP and a parameter for SCS of the BWP and optionally configuration information on PRACH occasions.

Terminal determines the active DL BWP based at least in part on the firstActiveDownlinkBWP-Id Terminal determines a first gap is to be active based at least in part on deactivatedMeasGapList of the active DL BWP if the first gap is not indicated in the deactivated-MeasGapList Terminal determines PRACH occasions are not configured in the active UL BWP of SpCell based at least in part on one or more UL BWP configuration information.

Terminal determines a second gap is to be active based at least in part on the presence of deactivatedMeasGapList of the initial DL BWP of SpCell Terminal activates the second gap.

Terminal receives a SIB 1.

The SIB1 includes a tdd-UL-DL-ConfigurationCommon Terminal receives a RRCReconfiguration message, the RRCReconfiguration message includes a first gap configuration information or a second gap configuration information or both, the first gap configuration information includes a musim-GapLength field and a musim-GapRepetitionAnd-Offset field, the musim-GapLength field indicates the length of the gap.

The musim-GapRepetitionAndOffset fie1 indicates the gap repetition period in ms and gap offset in number of subframes and includes a integer, the integer is chosen from a integer set, the highest value of the integer set is equal to the repetition period −1 and the integer is equal to the gap offset.

The second gap configuration information includes gapOffset and a ugl and a ugrp gapOffset indicates the gap offset and ugl indicates the length of the gap and ugrp indicates the repetition period.

Terminal determines the first subframe of each gap based at least in part on the integer and the highest value of the integer set if the first gap configuration information is included in the RRCReconfiguration Terminal determines the first slot of each gap based at least in part on the gapOffset and ugrp and the tdd-UL-DL-ConfigurationCommon if the second gap configuration information is included in the RRCReconfiguration Terminal receives a SIB1

The SIB1 includes a tdd-UL-DL-ConfigurationCommon

Terminal receives a RRCReconfiguration message,

The RRCReconfiguration message includes a second gap configuration information or one or more third gap configuration information and one or more measurement object configuration information, The second gap configuration information includes gapOffset and a ugl and a ugrp gapOffset indicates the gap offset and ugl indicates the length of the gap and ugrp indicates the repetition period.

Each of the one or more third gap configuration includes measGapId and a gapOffset and a mgl and a mgrp and a mgta.

Terminal determines the first slot of each gap based at least in part on the gapOffset and ugrp and the tdd-UL-DL-ConfigurationCommon if the second gap configuration information is included in the RRCReconfiguration Terminal determines the first subframe of each gap based at least in part on the gapOffset and the mgrp and the mgta if one or more third gap configuration information is included in the RRCReconfiguration Terminal performs the second operation group during each gap if the second gap configuration information is included in the RRCReconfiguration The second gap operation group includes performing transmission on PUCCH allocation for SR if SR is triggered and performing transmission on CG-PUSCH resource if configured grant is activated and performing transmission on PRACH resource if random access procedure is triggered and not performing SRS transmission at SRS transmission occasions.

Terminal performs the third operation group during each gap if the one or more third gap configuration information is included in the RRCReconfiguration.

The third gap operation group includes not performing transmission on PUCCH allocation for SR if SR is triggered and not performing transmission on CG-PUSCH resource if configured grant is activated and performing transmission on PRACH resource if random access procedure is triggered and not performing SRS transmission at the SRS transmission occasions.

Alternatively, Terminal determines the first subframe of each gap based at least in part on the gapOffset and ugrp if the second gap configuration information is included in the RRCReconfiguration and determines the first subframe of each gap based at least in part on the gapOffset and the mgrp and the mgta if the third gap configuration information is included in the RRCReconfiguration.

The second gap starts at a second slot, the second slot is determined based at least in part on the first subframe and the tdd-UL-DL-ConfigurationCommon, the second slot is or is not within the first subframe.

The third gap starts at a first slot of the first subframe

Terminal receives a RRCReconfiguration message,

The RRCReconfiguration message includes one or more gap configuration information, each of one or more gap configuration information includes a measGapId and a type2Indicator and a gapOffset and a mgl and a mgrp.

Terminal generates a L2 request message or a L3 request message.

Terminal transmits a first MAC PDU that includes the L2 request message or the L3 request message.

Terminal receives a second MAC PDU that includes a L2 response message or a L3 response message.

Terminal activates one or more gap based at least in part on the L2 response message or on the L3 response message.

The L2 request message includes a measGapId of a gap configuration information and the L3 request message includes information for gap length and gap repetition period and gap offset.

The L2 request message is generated If location measurements towards NR is started and if one or more Type2gap are configured and if at least one of the type2Gaps meets the measurement gap requirements.

The L3 request message is generated If location measurements towards NR is started and if one or more Type2gaps are configured and if none of the type2Gaps meets the measurement gap requirements.

The L2 response message includes one or more measGapId of one or more a gap configuration information and the L3 request message includes one or more gap configuration information.

The L2 response message is received in response to the L2 request message.

The L3 response message is received in response to the L3 request message.

A subheader for the L2 request message in the first MAC PDU consists of two reserved bits and a LCID field and eLCID field.

A subheader for the L2 response message in the second MAC PDU consists of a reserved bit and a F field and a LCID field and eLCID field and a L field.

A subheader for the L3 request message in the first MAC PDU and a subheader for the L3 response message in the second MAC PDU consists of a reserved bit and a F field and a LCID field and a L field.

Terminal receives a RRCReconfiguration message, the RRCReconfiguration message includes one or more first gap configuration information and one or more second gap configuration information, each of one or more first gap configuration information includes a first identity and a type2Indicator and a gapOffset and a mgl and a mgrp, each of one or more second gap configuration information includes a second identity and a musim-GapLength and a musim-GapRepetitionAndOffset.

Terminal generates a L2 request message, the L2 request message includes a third identity.

Terminal transmits a first MAC PDU that includes the L2 request message.

Terminal receives a second MAC PDU that includes a L2 response message, the L2 response message includes a third identity, the third identity in the L2 request message and the third identity in the L2 response message are same or different.

Terminal applies one or more first gap based at least in part on the third identity received in the L2 response message.

The third identity in the L2 request message is one of first identities.

The third identity in the L2 response message is one of first identities.

The second gap is applied/used when configured via the RRCReconfiguration message and the first gap is applied/used when activated via L2 response message.

Terminal receives a first RRCReconfiguration message, the first RRCReconfiguration message includes a first configuration related to the reporting of measurement gap requirement information, the first configuration includes a information related to the first gap(type1Gap) requirement reporting and a information related to the second gap (type4Gap) requirement reporting.

Terminal transmits a UEAssistanceInformation message based at least in part on the first configuration Terminal receives a second RRCReconfiguration message, the second RRCReconfiguration message includes a second configuration, the second configuration includes one or more gap configuration information, the gap configuration information includes a measGapId and a type2Indicator and a gapOffset and a mgl and a mgrp.

Terminal applies the second configuration in the second RRCReconfiguration message.

Terminal starts gap operation based at least in part on the one or more gap configuration information in the second configuration.

Terminal initiates RRC re-establishment procedure.

Terminal release the first configuration at a first point of time and the second configuration at a second point of time.

The first point of time is after the initiation of RRC re-establishment procedure and before cell selection.

The second point of time is after receiving RRCReestablishment message via SRB1 and before transmitting RRCReestablishmentComplete message via SRB1.

Terminal discards a type2Gap L2 request message at a third point of time and Terminal stops the gap operation at a fourth point of time.

The third point of time is after the initiation of RRC re-establishment and before the first point of time.

The fourth point of time is after the initiation of RRC re-establishment procedure and before discarding any type2Gap L2 request message.

Terminal receives a first RRCReconfiguration message, the first RRCReconfiguration message includes a first configuration related to the reporting of type5 gap assistance information, the first configuration includes a prohibit timer field.

Terminal transmits a UEAssistanceInformation message based at least in part on the first configuration.

Terminal receives a second RRCReconfiguration message, the second RRCReconfiguration message includes a second configuration, the second configuration includes one or more gap configuration information, the gap configuration information includes a first group of fields or a second group of fields, the first group of fields includes a musim-gapId field and musim-Starting-SFN-AndSubframe field and musim-GapLength field and the second group of fields includes a musim-gapId field and musim-GapRepetitionAndOff set field and musim-GapLength field.

Terminal applies the second configuration in the second RRCReconfiguration message.

Terminal starts aperiodic gap operation based at least in part on the gap configuration information if the gap configuration information includes the first group of fields and periodic gap operation based at least in part on the gap configuration information if the gap configuration information includes the second group of fields.

Terminal initiates RRC re-establishment procedure.

Terminal release the first configuration at a first point of time and the second configuration at a second point of time.

The first point of time is after the initiation of RRC re-establishment procedure and before transmitting RRCReestablishmentRequest message via SRB0.

The second point of time is after receiving RRCReestablishment message via SRB1 and before transmitting RRCReestablishmentComplete message via SRB1.

Terminal discards a type2Gap L2 request message at a third point of time and Terminal stops the gap operation at a fourth point of time.

The third point of time is after the initiation of RRC re-establishment and before the first point of time.

The fourth point of time is after the initiation of RRC re-establishment procedure and before discarding any type2Gap L2 request message.

The operations of base station are listed below.

Base station transmits a RRCReconfiguration message.

The RRCReconfiguration message includes one or more gap configuration information and one or more DL BWP configuration information and firstActiveDownlinkBWP.

Each of one or more gap configuration information includes a measGapId and a type2Indicator and a gapOffset and a mgl and a mgrp.

Each of one or more DL BWP configuration information includes a bwp-Id and a parameter for bandwidth of BWP and a parameter for SCS of the BWP and a deactivatedMeasGapList.

The active DL BWP is determined based at least in part on the firstActiveDownlinkBWP-id.

A first gap to be active is determined based at least in part on deactivatedMeasGapList of the active DL BWP if the first gap is not indicated in the deactivatedMeasGapList.

Base station transmits a UL grant, the UL grant includes a bandwidth part indicator.

A second gap is to be active if the second gap is not indicated in a deactivatedMeasGapList of a DL BWP having the same bwp-Id as the bwp-Id indicated in the bandwidth part indicator of the UL grant.

The second gap is activated by the terminal at a first point of time, the first point of time is determined based at least in part on a first constant and a first variable, and the first variable is a second constant if the SCS of the BWP is 15 kHz or 30 kHz and is a third constant if the SCS of the BWP is 60 kHz or 120 kHz The first constant and the second constant and the third constant are 5 and 1 and 0.75 respectively.

Base station transmits a RRCReconfiguration message, the RRCReconfiguration message includes one or more gap configuration information and one or more DL BWP configuration information and optionally firstActiveDownlinkBWP-id and a bwp-InactivityTimer and a defaultDownlinkBWP-Id, each of one or more gap configuration information includes a measGapId and a type2Indicator and a gapOffset and a mgl and a mgrp, each of one or more DL BWP configuration information includes a bwp-Id and a parameter for bandwidth of BWP and a parameter for SCS of the BWP and a deactivatedMeasGapList.

The active DL BWP is determined based at least in part on the firstActiveDownlinkBWP-id.

A first gap is determined is to be active based at least in part on a deactivatedMeasGapList of the active DL BWP if the first gap is not indicated in the deactivatedMeasGapList.

Terminal starts the bwp-InactivityTimer.

A second gap to be active is determined at least in part on a deactivatedMeasGapList of a DL BWP associated with the defaultDownlinkBWP-Id when bwp-InactivityTimer expires.

The second gap is activated by the terminal at a first point of time, the first point of time is determined based at least in part on a first constant and a first variable, and the first variable is a second constant if the SCS of the BWP is 15 kHz or 30 kHz and is a third constant if the SCS of the BWP is 60 kHz or 120 kHz.

The first constant and the second constant and the third constant are 5 and 1 and respectively.

Base station transmits a RRCReconfiguration message, the RRCReconfiguration message includes one or more gap configuration information and one or more SCell configuration information and one or more DL BWP configuration information and optionally firstActiveDownlinkBWP-id and a bwp-InactivityTimer and a defaultDownlinkBWP-Id, each of one or more gap configuration information includes a measGapId and a type2Indicator and a gapOffset and a mgl and a mgrp, each of one or more SCell configuration information includes a serving cell index and a serving cell configuration and a sCellDeactivationTimer and a deactivatedMeasGapList2, each of one or more DL BWP configuration information includes a bwp-Id and a parameter for bandwidth of BWP and a parameter for SCS of the BWP and a deactivatedMeasGapList.

The active DL BWP is determined based at least in part on the firstActiveDownlinkBWP-id.

A first gap to be active is determined based at least in part on deactivatedMeasGapList of the active DL BWP if the first gap is not indicated in the deactivatedMeasGapList.

Terminal determines to deactivate a SCell.

A second gap to be active is determined least in part on a deactivatedMeasGapList2 of the SCell.

A second gap is activated at a second point of time, the second point of time is determined based at least in part on a first constant and a second variable.

The second variable is determined based at least in part on the timing between the first MAC CE transmission and the corresponding acknowledgement if the SCell is deactivated by the first MAC CE.

The second variable is a fourth constant if the SCell is deactivated by expiry of sCellDeactivationTimer.

The second variable is a fifth constant if the SCell is deactivated by a first DL RRC message, the first DL RRC message is RRCReconfiguration including the configuration of SCell addition.

The first constant and the fourth constant and the fifth constant are 5 and 3 and 16 respectively.

Base station transmits a SIB1.

The SIB1 includes a DL BWP configuration information for a initial DL BWP and a UL BWP configuration information for a initial UL BWP.

The UL BWP configuration for the initial UL BWP includes configuration information on PRACH occasions.

Base station transmits a RRCReconfiguration message.

The RRCReconfiguration message includes one or more gap configuration information and one or more DL BWP configuration information and one or more UL BWP configuration information and firstActiveDownlinkBWP-id and a bwp-InactivityTimer and a defaultDownlinkBWP-Id.

Each of one or more gap configuration information includes a measGapId and a type2Indicator and a gapOffset and a mgl and a mgrp.

Each of one or more DL BWP configuration information includes a bwp-Id and a parameter for bandwidth of BWP and a parameter for SCS of the BWP and a deactivated-MeasGapList.

Each of one or more UL BWP configuration information includes a bwp-Id and a parameter for bandwidth of BWP and a parameter for SCS of the BWP and optionally configuration information on PRACH occasions.

The active DL BWP is determined based at least in part on the firstActiveDownlinkBWP-Id.

A first gap to be active is determined based at least in part on deactivatedMeasGapList of the active DL BWP if the first gap is not indicated in the deactivatedMeasGapList.

Terminal determines PRACH occasions are not configured in the active UL BWP of SpCell based at least in part on one or more UL BWP configuration information.

A second gap to be active is determined least in part on the presence of deactivatedMeasGapList of the initial DL BWP of SpCell.

Base station transmits a SIB1

The SIB1 includes a tdd-UL-DL-ConfigurationCommon

Base station transmits a RRCReconfiguration message, the RRCReconfiguration message includes a first gap configuration information or a second gap configuration information or both, the first gap configuration information includes a musim-GapLength field and a musim-GapRepetitionAndOffset field, the musim-GapLength field indicates the length of the gap.

The musim-GapRepetitionAndOffset fie1 indicates the gap repetition period in ms and gap offset in number of subframes and includes a integer, the integer is chosen from a integer set, the highest value of the integer set is equal to the repetition period −1 and the integer is equal to the gap offset.

The second gap configuration information includes gapOffset and a ugl and a ugrp.

gapOffset indicates the gap offset and ugl indicates the length of the gap and ugrp indicates the repetition period.

The first subframe of each gap is determined based at least in part on the integer and the highest value of the integer set if the first gap configuration information is included in the RRCReconfiguration.

The first slot of each gap is determined based at least in part on the gapOffset and ugrp and the tdd-UL-DL-ConfigurationCommon if the second gap configuration information is included in the RRCReconfiguration.

Base station transmits a SIB1

The SIB1 includes a tdd-UL-DL-ConfigurationCommon

Base station transmits a RRCReconfiguration message, the RRCReconfiguration message includes a second gap configuration information or one or more third gap configuration information and one or more measurement object configuration information, the second gap configuration information includes gapOffset and a ugl and a ugrp.

GapOffset indicates the gap offset and ugl indicates the length of the gap and ugrp indicates the repetition period.

Each of the one or more third gap configuration includes measGapId and a gapOffset and a mgl and a mgrp and a mgta.

The first slot of each gap is determined based at least in part on the gapOffset and ugrp and the tdd-UL-DL-ConfigurationCommon if the second gap configuration information is included in the RRCReconfiguration.

The first subframe of each gap is determined based at least in part on the gapOffset and the mgrp and the mgta if one or more third gap configuration information is included in the RRCReconfiguration.

The second operation group is performed during each gap if the second gap configuration information is included in the RRCReconfiguration.

The second gap operation group includes performing transmission on PUCCH allocation for SR if SR is triggered and performing transmission on CG-PUSCH resource if configured grant is activated and performing transmission on PRACH resource if random access procedure is triggered and not performing SRS transmission at SRS transmission occasions.

The third operation group is performed during each gap if the one or more third gap configuration information is included in the RRCReconfiguration, The third gap operation group includes not performing transmission on PUCCH allocation for SR if SR is triggered and not performing transmission on CG-PUSCH resource if configured grant is activated and performing transmission on PRACH resource if random access procedure is triggered and not performing SRS transmission at the SRS transmission occasions.

Alternatively, the first subframe of each gap is determined based at least in part on the gapOffset and ugrp if the second gap configuration information is included in the RRCReconfiguration and determines the first subframe of each gap based at least in part on the gapOffset and the mgrp and the mgta if the third gap configuration information is included in the RRCReconfiguration.

The second gap starts at a second slot, the second slot is determined based at least in part on the first subframe and the tdd-UL-DL-ConfigurationCommon, the second slot is or is not within the first subframe.

The third gap starts at a first slot of the first subframe.

Base station transmits a RRCReconfiguration message, the RRCReconfiguration message includes one or more gap configuration information, each of one or more gap configuration information includes a measGapId and a type2Indicator and a gapOffset and a mgl and a mgrp.

A L2 request message or a L3 request message is generated by the terminal.

Base station receives a first MAC PDU that includes the L2 request message or the L3 request message.

Base station transmits a second MAC PDU that includes a L2 response message or a L3 response message.

One or more gap are activated based at least in part on the L2 response message or on the L3 response message.

The L2 request message includes a measGapId of a gap configuration information and the L3 request message includes information for gap length and gap repetition period and gap offset The L2 request message is generated If location measurements towards NR is started and if one or more Type2gaps are configured and if at least one of the type2Gaps meets the measurement gap requirements The L3 request message is generated If location measurements towards NR is started and if one or more Type2gaps are configured and if none of the type2Gaps meets the measurement gap requirements The L2 response message includes one or more measGapId of one or more a gap configuration information and the L3 request message includes one or more gap configuration information The L2 response message is received in response to the L2 request message.

The L3 response message is received in response to the L3 request message.

A subheader for the L2 request message in the first MAC PDU consists of two reserved bits and a LCID field and eLCID field.

A subheader for the L2 response message in the second MAC PDU consists of a reserved bit and a F field and a LCID field and eLCID field and a L field.

A subheader for the L3 request message in the first MAC PDU and a subheader for the L3 response message in the second MAC PDU consists of a reserved bit and a F field and a LCID field and a L field.

Base station transmits a RRCReconfiguration message, the RRCReconfiguration message includes one or more first gap configuration information and one or more second gap configuration information, each of one or more first gap configuration information includes a first identity and a type2Indicator and a gapOffset and a mgl and a mgrp, each of one or more second gap configuration information includes a second identity and a musim-GapLength and a musim-GapRepetitionAndOffset.

Terminal a L2 request message is generated, the L2 request message includes a third identity.

Base station receives a first MAC PDU that includes the L2 request message.

Base station transmits a second MAC PDU that includes a L2 response message, the L2 response message includes a third identity, the third identity in the L2 request message and the third identity in the L2 response message are same or different.

One or more first gap are applied based at least in part on the third identity received in the L2 response message.

The third identity in the L2 request message is one of first identities.

The third identity in the L2 response message is one of first identities.

The second gap is applied/used when configured via the RRCReconfiguration message and the first gap is applied/used when activated via L2 response message.

Base station transmits a first RRCReconfiguration message, the first RRCReconfiguration message includes a first configuration related to the reporting of measurement gap requirement information, the first configuration includes a information related to the first gap(type1Gap) requirement reporting and a information related to the second gap (type4Gap) requirement reporting.

Base station receives a UEAssistanceInformation message based at least in part on the first configuration Base station transmits a second RRCReconfiguration message, the second RRCReconfiguration message includes a second configuration, the second configuration includes one or more gap configuration information, the gap configuration information includes a measGapId and a type2Indicator and a gapOffset and a mgl and a mgrp, the second configuration in the second RRCReconfiguration message is applied.

Gap operation is started based at least in part on the one or more gap configuration information in the second configuration.

RRC re-establishment procedure is initiated.

The first configuration is released at a first point of time and the second configuration at a second point of time.

The first point of time is after the initiation of RRC re-establishment procedure and before cell selection.

The second point of time is after receiving RRCReestablishment message via SRB1 and before transmitting RRCReestablishmentComplete message via SRB1.

A type2Gap L2 request message is discarded at a third point of time and terminal stops the gap operation at a fourth point of time.

The third point of time is after the initiation of RRC re-establishment and before the first point of time.

The fourth point of time is after the initiation of RRC re-establishment procedure and before discarding any type2Gap L2 request message.

Base station transmits a first RRCReconfiguration message, the first RRCReconfiguration message includes a first configuration related to the reporting of type5 gap assistance information, the first configuration includes a prohibit timer field.

Base station receives a UEAssistanceInformation message based at least in part on the first configuration.

Base station transmits a second RRCReconfiguration message, the second RRCReconfiguration message includes a second configuration, the second configuration includes one or more gap configuration information, the gap configuration information includes a first group of fields or a second group of fields, the first group of fields includes a musim-gapId field and musim-Starting-SFN-AndSubframe field and musim-GapLength field and the second group of fields includes a musim-gapId field and musim-GapRepetitionAndOff set field and musim-GapLength field.

The second configuration in the second RRCReconfiguration message is applied.

Terminal starts aperiodic gap operation based at least in part on the gap configuration information if the gap configuration information includes the first group of fields and periodic gap operation based at least in part on the gap configuration information if the gap configuration information includes the second group of fields.

RRC re-establishment procedure is initiated.

The first configuration is released at a first point of time and the second configuration at a second point of time.

The first point of time is after the initiation of RRC re-establishment procedure and before transmitting RRCReestablishmentRequest message via SRB0.

The second point of time is after receiving RRCReestablishment message via SRB1 and before transmitting RRCReestablishmentComplete message via SRB1.

A type2Gap L2 request message is discarded at a third point of time and terminal stops the gap operation at a fourth point of time.

The third point of time is after the initiation of RRC re-establishment and before the first point of time.

The fourth point of time is after the initiation of RRC re-establishment procedure and before discarding any type2Gap L2 request message.

The terminal is configured with h SR configurations and j SR resource configurations and k PUCCH resource configurations and m serving cells and n UL BWPs. h and j and k are integers equal to or greater than zero. m and n are integers equal to or greater than one. h and j and k and m and n can be different from or equal to each other.

Each of h SR configurations consists of an identifier 1 (SchedulingRequestId) and a first timer value (sr-ProhibitTimer) and a first counter value (sr-TransMax).

Each of h SR configurations is applied to the terminal in one or more UL BWPs. Each of j SR resource configurations is applied to the terminal in an UL BWP associated with the SR resource configuration. Each of k PUCCH resource configurations is applied to the terminal in an UL BWP associated with the PUCCH resource configuration.

The one or more UL BWP is the SpCell's UL BWP for which at least one SR resource configuration is configured.

The UL BWP associated with a SR resource configuration is the UL BWP for which the SR resource configuration is configured.

The UL BWP associated with PUCCH resource configuration is the UL BWP for which the PUCCH resource configuration is configured.

Each of m SR resource configurations consists of an identifier2 (schedulingRequestResourceId) and an identifier1 (SchedulingRequestId) and an identifier3 (pucch-ResourceId) and a parameter representing periodicity and offset in number of symbols or slots.

A SR resource configuration and a SR configuration are associated with each other if they have a same identifier 1.

A SR configuration is associated with a PUCCH resource configuration if the PUCCH resource configuration is indicated in the associated SR resource configuration.

A CellGroupConfig includes a mac-CellGroupConfig and one or more ServingCellConfig.

A ServingCellConfig includes one or more BWP-UplinkDedicated.

A SR configuration is included in mac-CellGroupConfig in CellGroupConfig.

A PUCCH-Config is included in a BWP-UplinkDedicated.

A PUCCH-Config includes zero or more SR resource configurations and zero or more PUCCH-Resource configurations.

A SR resource configuration is included in a PUCCH-Config in a BWP-UplinkDedicated in a ServingCellConfig in a CellGroupConfig.

A PUCCH-resource configuration is included in a PUCCH-Config in a BWP-UplinkDedicated in a ServingCellConfig in a CellGroupConfig.

Terminal transmits a SR on PUCCH resource determined based at least in part on the identifier1 and the identifier2 and the identifier3.

The terminal triggers a Scheduling Request for a second UL MAC CE (type7Gap L2 request message) if the second UL MAC CE (type7Gap L2 request message) has been triggered and not cancelled and UL-SCH resources are not sufficient to accommodate the second UL MAC CE (type7Gap L2 request message) plus subheader.

The terminal triggers a Scheduling Request for a second UL MAC CE (type7Gap L2 request message) if the second UL MAC CE (type7Gap L2 request message) has been triggered and not cancelled and UL-SCH resources are not available for a new transmission.

The terminal signals the scheduling request on a first PUCCH resource if a sr-ProhibitTimer is not running and SR_COUNTER is smaller than a sr-TransMax and the Scheduling Request for the second UL MAC CE (type7Gap L2 request message) is pending.

An SR is considered pending after it is triggered and before it is cancelled.

The sr-ProhibitTimer and the sr-TransMax and the first PUCCH resource are determined based on a first SR configuration and a first SR resource configuration.

The first SR configuration is indicated by a schedulingRequestID-Type7GapReq field in a mac-CellGroupConfig IE if the schedulingRequestID-Type7GapReq field is included in a mac-CellGroupConfig IE.

The first SR configuration is one of a first SR configuration group (or the first SR configuration is any SR configuration of the first SR configuration group; the first SR configuration is any SR configuration valid in the currently active UL BWP of SpCell) if the schedulingRequestID-Type7GapReq field is not included in a mac-CellGroupConfig IE.

The first SR configuration group comprises SR configurations associated with the currently active UL BWP of a SpCell.

A SR configuration is associated with an UL BWP if an associated SR resource configuration is configured for the UL BWP.

A SR resource configuration associated with a SR configuration is the SR resource configuration configured with the same identifier 1 as the SR resource configuration.

A SR configuration is valid in a UL BWP if an associated SR resource configuration is configured for the UL BWP.

The terminal signals the scheduling request on a first PUCCH resource with a spatial setting provided by a first PUCCH-SpatialRelationInfo if a sr-ProhibitTimer is not running and SR_COUNTER is smaller than a sr-TransMax and the Scheduling Request for the second UL MAC CE (type7Gap L2 request message) is pending.

The first PUCCH-SpatialRelationInfo is indicated by a PUCCH Spatial Relation Activation/Deactivation MAC CE. The PUCCH Spatial Relation Activation/Deactivation MAC CE comprises a Serving Cell ID field setting to the ServCellIndex of the SpCell and a BWP ID field setting to the bwp-Id of the currently active UL BWP and the PUCCH Resource ID field setting to the identifier3 of the first PUCCH resource and a Spatial Relation Info ID containing a PUCCH-SpatialRelationInfold−1. The PUCCH-SpatialRelationInfold corresponds to the first PUCCH-SpatialRelationInfo.

The terminal determines that a type7Gap with a measGapId2 equal to n is sufficient for performing location measurements towards NR.

The terminal transmits to the base station a first MAC PDU containing/including a type7Gap L2 request message. The Type7Gap L2 request message includes a A/D field and a MG ID field.

The MG ID field is set to −1. The A/D field is set to 1.

The terminal starts to perform location measurements toward NR

The terminal generates, based on the result of logical channel prioritization, a MAC subPDU requesting activation of a measurement gap for positioning.

The terminal includes the MAC subPDU in a MAC PDU.

The terminal transmits to the base station the MAC PDU.

The MAC subPDU includes a type7Gap request L2 message if type7Gaps are configured and at least one of type7Gap is sufficient for the location measurement.

The MAC subPDU includes a type7Gap request L3 message if type7Gap is not configured.

The priority of the type7Gap request L2 message is higher than the priority of the type7Gap request L3 message.

MAC subheader of the MAC subPDU including the type7Gap request L2 message consists of a first LCID field and a second LCID field.

MAC subheader of the MAC subPDU including the type7Gap request L3 message consists of a first LCID field and a L field.

The MAC subPDU including the type7Gap request L2 message include a information representing a measurement gap for positioning reference signal measurement The MAC subPDU including the type7Gap request L2 message include a information representing a positioning reference signal The terminal triggers a scheduling request for either transmitting a first MAC CE or a second MAC CE.

The terminal transmits a SR according to a first SR configuration or a second SR configuration.

The terminal receives an UL grant for new transmission.

The terminal determines whether to allocate resource for the MAC CE based at least in part on the priority of the MAC CE.

The terminal transmits a MAC PDU.

The first SR configuration is indicated by a SR configuration identifier in a MAC-CellGroupConfig. The first SR configuration is used if the first MAC CE triggers the scheduling request.

The second SR configuration is any SR configurations of the MAC-CellGroupConfig.

The second SR configuration is any SR configuration among SR configurations configured in the MAC-Cell-Group-Config.

A priority of the first MAC CE is higher than a priority of the second MAC CE.

MAC subheader of the MAC subPDU including the second MAC CE consists of a first LCID field and a second LCID field.

MAC subheader of the MAC subPDU including the first MAC CE consists of a first LCID field and a L field.

The First MAC CE is BFR MAC CE.

The Second MAC CE is type7Gap L2 request message.

The terminal receives a MAC PDU including a MAC subPDU at a first point of time. The MAC subPDU comprises a MAC subheader and a Type7Gap L2 response message.

The Type7Gap L2 response message includes a A/D field and a MG ID field.

The terminal finishes the activation of a Type7Gap until a second point of time if the A/D field is set to 1 measGapId2 of the Type7Gap to be activated is equal to the first value plus one. The first value is indicated in the MG ID field.

The second point of time is determined based at least in part on the first point of time and the first variable time period (T_HARQ) and a second constant time period (x ms).

The first variable time period is determined by the timing of the DL data transmission and the acknowledgement. The DL data contains the MAC PDU. The acknowledgement is a positive acknowledgement for the DL data.

The second constant time period is fixed and common to a plurality of terminals.

The terminal receives a MAC PDU including a MAC subPDU at a first point of time. The MAC subPDU comprises a MAC subheader and a information resulting in measurement gap activation.

The terminal finishes the activation of the measurement gap until a second point of time if the information resulting in measurement gap activation is a Type7Gap L2 request.

The second point of time is determined based at least in part on the first point of time and the first variable time period (T_HARQ) and a first constant time period (x ms).

The first variable time period is determined by the timing of the DL data transmission and the acknowledgement. The DL data contains the MAC PDU. The acknowledgement is a positive acknowledgement for the DL data.

The first constant time period is fixed and common for a plurality of terminals.

The terminal finishes the activation of the measurement gap until a third point of time if the information resulting in measurement gap activation is a SCell activation request.

The third point of time is determined based at least in part on the fourth point of time and the second constant time period.

The fourth point of time is when a first SCell activation is completed. The first SCell is associated with the measurement gap. determined based on type2GapStatus2.

The terminal transmits to the base station a UECapabilityInformation. The UECapabilityInformation includes a Type7GapInfo2 indicating support of low latency measurement gap activation request and a Type7GapInfo1 indicating support of low latency measurement gap activation.

The terminal transmits to the LMF a ProvideCapabilities. The ProvideCapabilities includes a Type7GapInfo3 indicating support of low latency measurement gap activation.

Figure 3:
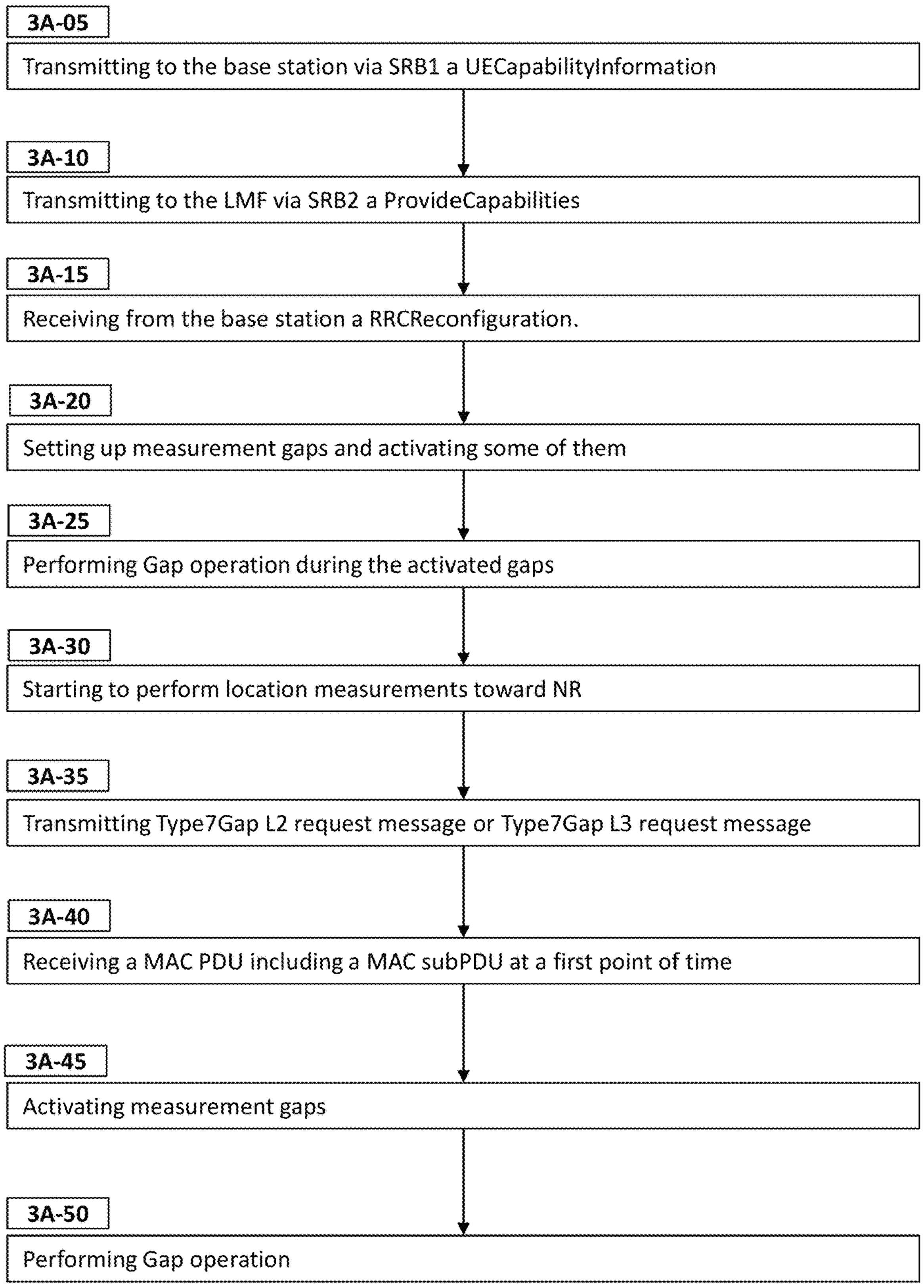
FIG. 3 is a flow diagram illustrating an operation of a terminal.

FIG. 3 is a flow diagram illustrating an operation of a terminal.

In 3A-05, UE transmits to the base station via SRB1 a UECapabilityInformation.

The UECapabilityInformation includes a Type7GapInfo2 indicating support of low latency measurement gap activation request and a Type7GapInfo1 indicating support of low latency measurement gap activation.

In 3A-10, UE transmits to the LMF via SRB2 a ProvideCapabilities. The ProvideCapabilities includes a Type7GapInfo3 indicating support of low latency measurement gap activation.

In 3A-15, UE receives from the base station a RRCReconfiguration. The RRCReconfiguration includes a MAC-CellGroupConfig IE and one or more PUCCH-Config IEs and a MeasGapConfig IE.

In 3A-20, UE sets up measurement gaps and activates some of them.

In 3A-25, UE performs Gap operation during the activated gaps.

In 3A-30, UE starts to perform location measurements toward NR.

UE generates a MAC subPDU requesting activation of a measurement gap for positioning based on the result of logical channel prioritization.

In 3A-35, UE transmits Type7Gap L2 request message or Type7Gap L3 request message.

In 3A-40, UE receives a MAC PDU including a MAC subPDU at a first point of time. The MAC subPDU comprises a MAC subheader and a information resulting in measurement gap activation.

In 3A-45, UE activates measurement gaps in accordance with the received message.

UE finishes the activation of the measurement gap until a second point of time if the information resulting in measurement gap activation is a Type7Gap L2 request.

The second point of time is determined based at least in part on the first point of time and the first variable time period (T_HARQ) and a first constant time period (x ms).

The first variable time period is determined by the timing of the DL data transmission and the acknowledgement. The DL data contains the MAC PDU. The acknowledgement is a positive acknowledgement for the DL data.

The first constant time period is fixed and common for a plurality of UEs.

UE finishes the activation of the measurement gap until a third point of time if the information resulting in measurement gap activation is a SCell activation request.

The third point of time is determined based at least in part on the fourth point of time and the second constant time period.

The fourth point of time is when a first SCell activation is completed. The first SCell is associated with the measurement gap. determined based on type2GapStatus2.

In 3A-50, UE performs Gap operation.

Figure 4A:
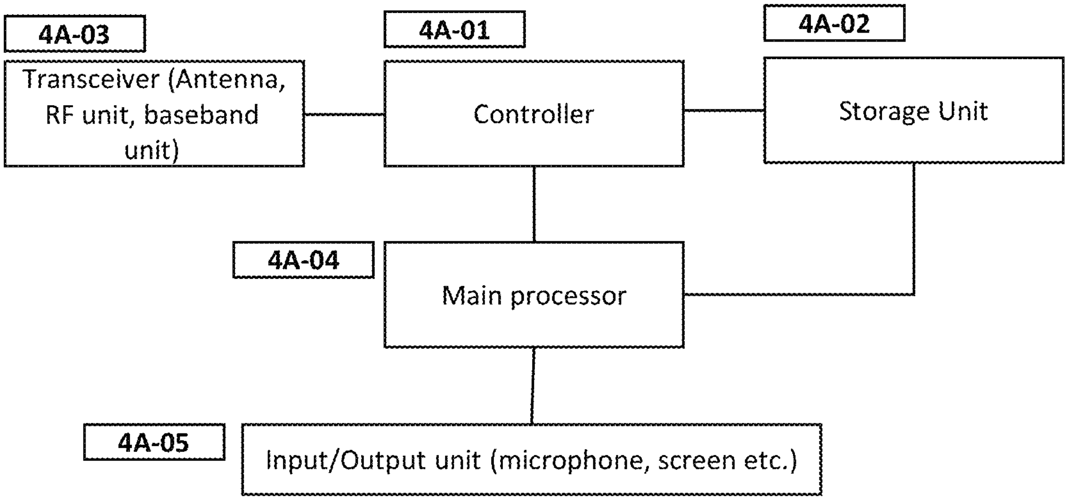
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
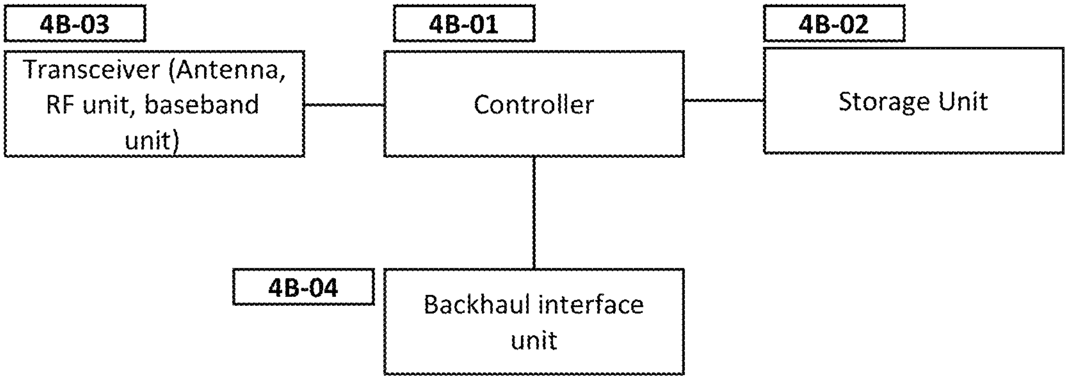
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method performed by a terminal, the method comprising:

transmitting, by the terminal to a base station, a UECapabilityInformation, the UECapabilityInformation includes a first capability information related to positioning gap activation and a second capability information related to positioning gap activation, the first capability information indicates support for positioning gap activation with uplink Medium Access Control (MAC) Control Element (CE), and the second capability information indicates support for positioning gap activation with downlink MAC CE;

receiving, by the terminal from the base station, a RRCReconfiguration, the RRCReconfiguration includes one or more gap configurations, a MAC-CellGroupConfig, and one or more uplink bandwidth part configurations, each of the one or more gap configurations includes an identifier of a gap, the MAC-CellGroupConfig includes a first field and one or more first configurations, each of the one or more first configurations includes an identifier1, a value for a prohibit timer, and a value for a counter, each of the one or more uplink bandwidth part configurations includes one or more second configurations, and each of the one or more second configurations includes the identifier1, an identifier2, and a parameter indicating periodicity and offset;

triggering, by the terminal, a Scheduling Request for a first MAC CE if the first MAC CE has been triggered and not cancelled and if uplink shared channel resources are not available for a new transmission;

performing, by the terminal, Scheduling Request transmission based on a specific first configuration and a specific second configuration;

transmitting, by the terminal to the base station, the first MAC CE to request activation of a first gap; and receiving, by the terminal from the base station, a second MAC CE, the second MAC CE includes a fourth field and a fifth field, the fourth field indicates activation or deactivation of a second gap, and the fifth field includes a value corresponding to an identifier of the second gap, wherein the specific first configuration is the first configuration indicated by the first field, and the specific second configuration is the second configuration associated with the first configuration indicated by the first field, and wherein the first MAC CE includes a second field and a third field, the second field includes a value corresponding to the identifier of the gap, and the third field indicates activation or deactivation of the first gap.

2. The method of claim 1, wherein a gap having the identifier of the gap equal to the value indicated in the fifth field plus one is indicated to be activated or to be deactivated.

3. The method of claim 1, wherein the first MAC CE further includes an R field, and the R field is a reserved bit field.

4. The method of claim 1, wherein the first configuration is associated with the second configuration if the identifier1 of the first configuration is included in the second configuration.

5. A terminal in a wireless communication system, the terminal comprising:

a transceiver configured to transmit and receive signals; and a controller configured to control the transceiver to:

transmit to a base station a UECapabilityInformation, the UECapability Information includes a first capability information related to positioning gap activation and a second capability information related to positioning gap activation, the first capability information indicates support for positioning gap activation with uplink Medium Access Control (MAC) Control Element (CE), and the second capability information indicates support for positioning gap activation with downlink MAC CE;

receive from the base station a RRCReconfiguration, the RRCReconfiguration includes one or more gap configurations, a MAC-CellGroupConfig, and one or more uplink bandwidth part configurations, each of the one or more gap configurations includes an identifier of a gap, the MAC-CellGroupConfig includes a first field and one or more first configurations, each of the one or more first configurations includes an identifier1, a value for a prohibit timer, and a value for a counter, each of the one or more uplink bandwidth part configurations includes one or more second configurations, and each of the one or more second configurations includes the identifier1, an identifier2, and a parameter indicating periodicity and offset;

trigger a Scheduling Request for a first MAC CE if the first MAC CE has been triggered and not cancelled and if uplink shared channel resources are not available for a new transmission;

perform Scheduling Request transmission based on a specific first configuration and a specific second configuration;

transmit, to the base station, the first MAC CE to request activation of a first gap; and receive, from the base station, a second MAC CE, the second MAC CE includes a fourth field and a fifth field, the fourth field indicates activation or deactivation of a second gap, and the fifth field includes a value corresponding to an identifier of the second gap, wherein the specific first configuration is the first configuration indicated by the first field, and the specific second configuration is the second configuration associated with the first configuration indicated by the first field, and wherein the first MAC CE includes a second field and a third field, the second field includes a value corresponding to the identifier of the gap, and the third field indicates activation or deactivation of the first gap.

6. A method performed by a base station, the method comprising:

receiving, by the base station from a terminal, a UECapabilityInformation, the UECapabilityInformation includes a first capability information related to positioning gap activation and a second capability information related to positioning gap activation, the first capability information indicates support for positioning gap activation with uplink Medium Access Control (MAC) Control Element (CE), and the second capability information indicates support for positioning gap activation with downlink MAC CE;

transmitting, by the base station to the terminal, a RRCReconfiguration, the RRCReconfiguration includes one or more gap configurations, a MAC-CellGroupConfig, and one or more uplink bandwidth part configurations, each of the one or more gap configurations includes an identifier of a gap, the MAC-CellGroupConfig includes a first field and one or more first configurations, each of the one or more first configurations includes an identifier1, a value for a prohibit timer, and a value for a counter, each of the one or more uplink bandwidth part configurations includes one or more second configurations, and each of the one or more second configurations includes the identifier1, an identifier2, and a parameter indicating periodicity and offset;

performing, by the base station, Scheduling Request reception based on a specific first configuration and a specific second configuration;

receiving, by the base station from the terminal, the first MAC CE related to activation of the first gap; and transmitting, by the base station to the terminal, a second MAC CE, the second MAC CE includes a fourth field and a fifth field, the fourth field indicates activation or deactivation of a second gap, and the fifth field includes a value corresponding to an identifier of the second gap, wherein the specific first configuration is the first configuration indicated by the first field, and the specific second configuration is the second configuration associated with the first configuration indicated by the first field, and wherein the first MAC CE includes a second field and a third field, the second field includes a value corresponding to the identifier of the gap, and the third field indicates activation or deactivation of the first gap.

* * * * *